US012593263B2

(12) United States Patent
Raghavendra et al.

(10) Patent No.: US 12,593,263 B2
(45) Date of Patent: Mar. 31, 2026

(54) SYSTEMS AND METHODS FOR DYNAMIC CONTENT HANDLING OF INTER-LAYER MESSAGES IN A POD BASED CLOUD NATIVE ENVIRONMENT

(71) Applicant: Rakuten Symphony, Inc., Tokyo (JP)

(72) Inventors: Raghavendra, Bangalore (IN); Pradeep Kumar Nalla, Bangalore (IN)

(73) Assignee: RAKUTEN SYMPHONY, INC., Tokyo (JP)

( * ) Notice: Subject to any disclaimer, the term of this patent is extended or adjusted under 35 U.S.C. 154(b) by 441 days.

(21) Appl. No.: 18/024,295

(22) PCT Filed: Feb. 3, 2023

(86) PCT No.: PCT/US2023/012253
§ 371 (c)(1),
(2) Date: Mar. 2, 2023

(87) PCT Pub. No.: WO2024/162968
PCT Pub. Date: Aug. 8, 2024

(65) Prior Publication Data
US 2024/0314676 A1 Sep. 19, 2024

(51) Int. Cl.
*H04W 48/08* (2009.01)
*H04W 88/08* (2009.01)
(52) U.S. Cl.
CPC .......... *H04W 48/08* (2013.01); *H04W 88/085* (2013.01)
(58) Field of Classification Search
CPC ..................... H04W 88/085; G06F 2201/84
See application file for complete search history.

(56) References Cited

U.S. PATENT DOCUMENTS

| | | | | |
|---|---|---|---|---|
| 2012/0230240 A1* | 9/2012 | Nebat | .................. | H04L 12/189 370/312 |
| 2023/0007623 A1* | 1/2023 | Da Silva | .............. | H04W 76/19 |
| 2023/0224380 A1* | 7/2023 | Park | ................. | H04W 36/0033 370/331 |

OTHER PUBLICATIONS

International Search Report issued May 17, 2023 in Application No. PCT/US23/12253.
Written Opinion issued May 17, 2023 in Application No. PCT/US23/12253.

* cited by examiner

*Primary Examiner* — Fabricio R Murillo Garcia
(74) *Attorney, Agent, or Firm* — Sughrue Mion, PLLC

(57) ABSTRACT

A method for implementing dynamic content handling of inter layer messages in a pod based cloud native environment, the method includes: receiving, by a virtual centralized unit (vCU), at least one Master Information Block (MIB) parameter configured by a virtual element management system (vEMS); preparing, by the vCU, a MIB encoded buffer may include a Dummy System Frame Number (D-SFN); sending, by the vCU, once at the time of startup initiation, the MIB encoded buffer with the D-SFN to a virtual distributed unit (vDU) via a Midhaul between the vCU and the vDU; receiving, by the vDU, the MIB encoded buffer with the D-SFN via the Midhaul; for each received MIB encoded buffer, by the vDU, calculating a new SFN from an utility function; updating the MIB encoded buffer; and sending the updated MIB encoded buffer with the new SFN from the utility function to a user entity (UE).

18 Claims, 12 Drawing Sheets

Figure 2A:
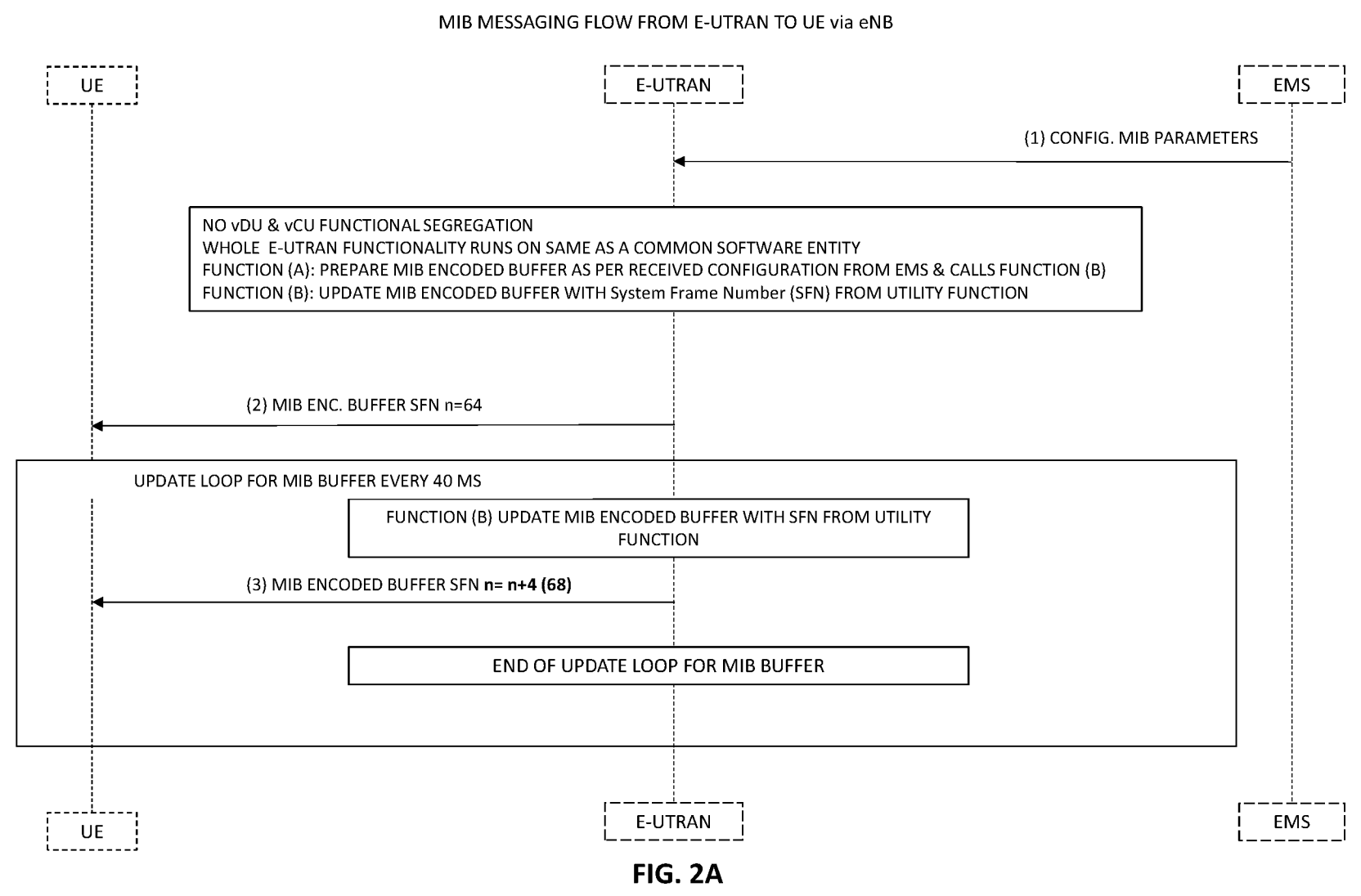

MIB MESSAGING FLOW FROM E-UTRAN TO UE via eNB

EMS

E-UTRAN

UE (1) CONFIG. MIB PARAMETERS

NO vDU & vCU FUNCTIONAL SEGREGATION
WHOLE E-UTRAN FUNCTIONALITY RUNS ON SAME AS A COMMON SOFTWARE ENTITY
FUNCTION (A): PREPARE MIB ENCODED BUFFER AS PER RECEIVED CONFIGURATION FROM EMS & CALLS FUNCTION (B)
FUNCTION (B): UPDATE MIB ENCODED BUFFER WITH System Frame Number (SFN) FROM UTILITY FUNCTION (2) MIB ENC. BUFFER SFN n=64

UPDATE LOOP FOR MIB BUFFER EVERY 40 MS

FUNCTION (B) UPDATE MIB ENCODED BUFFER WITH SFN FROM UTILITY FUNCTION (3) MIB ENCODED BUFFER SFN n= n+4 (68)

END OF UPDATE LOOP FOR MIB BUFFER

EMS

E-UTRAN

Figure 2B:
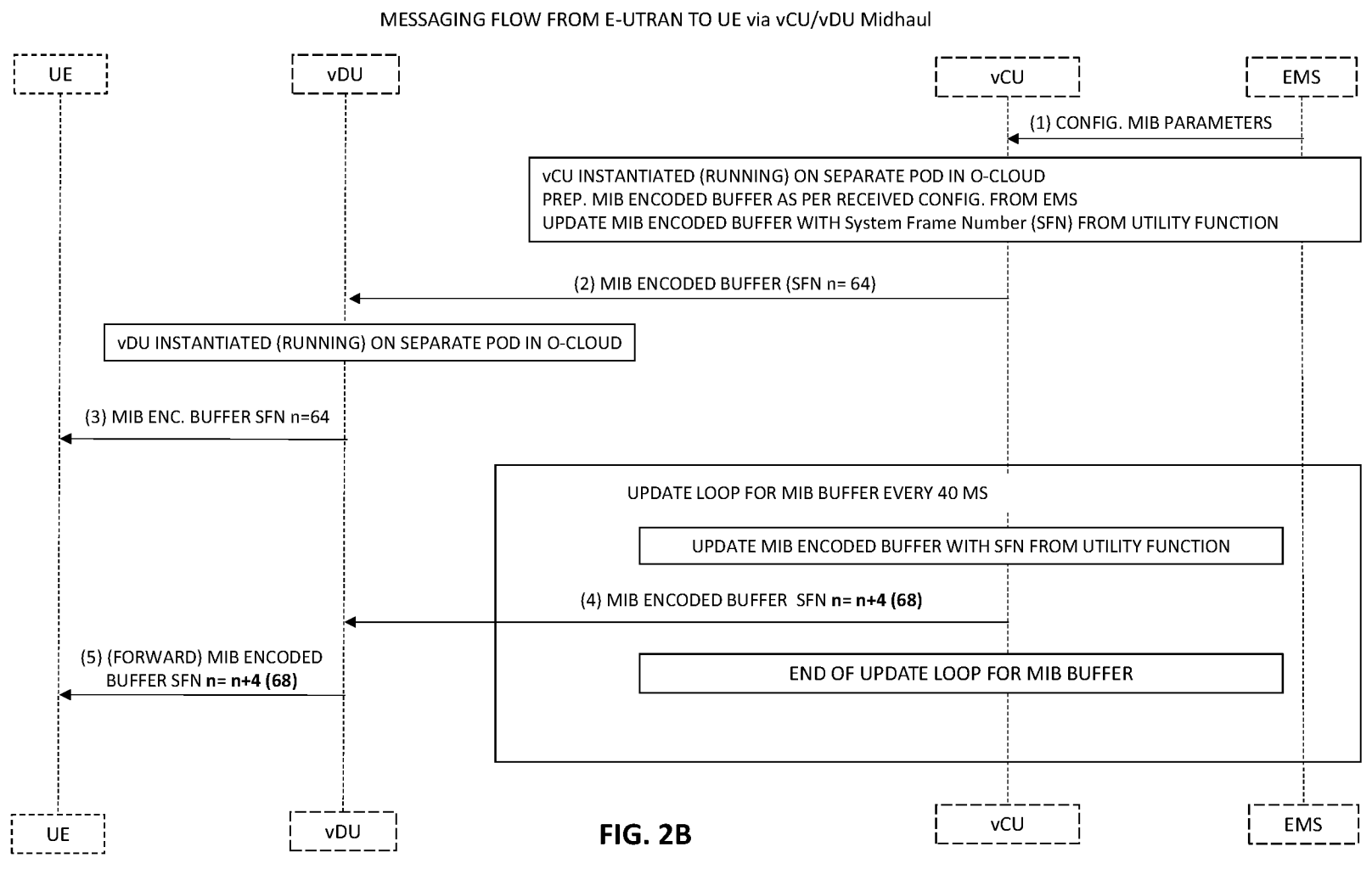

MESSAGING FLOW FROM E-UTRAN TO UE via vCU/vDU Midhaul

EMS (1) CONFIG. MIB PARAMETERS vCU vCU INSTANTIATED (RUNNING) ON SEPARATE POD IN O-CLOUD
PREP. MIB ENCODED BUFFER AS PER RECEIVED CONFIG. FROM EMS
UPDATE MIB ENCODED BUFFER WITH System Frame Number (SFN) FROM UTILITY FUNCTION (2) MIB ENCODED BUFFER (SFN n=64)

UPDATE LOOP FOR MIB BUFFER EVERY 40 MS

UPDATE MIB ENCODED BUFFER WITH SFN FROM UTILITY FUNCTION (4) MIB ENCODED BUFFER  SFN n= n+4 (68)

END OF UPDATE LOOP FOR MIB BUFFER

EMS vCU

FIG. 2B vDU vDU INSTANTIATED (RUNNING) ON SEPARATE POD IN O-CLOUD (3) MIB ENC. BUFFER SFN n=64

(5) (FORWARD) MIB ENCODED
BUFFER SFN n= n+4 (68)

vDU

UE

UE

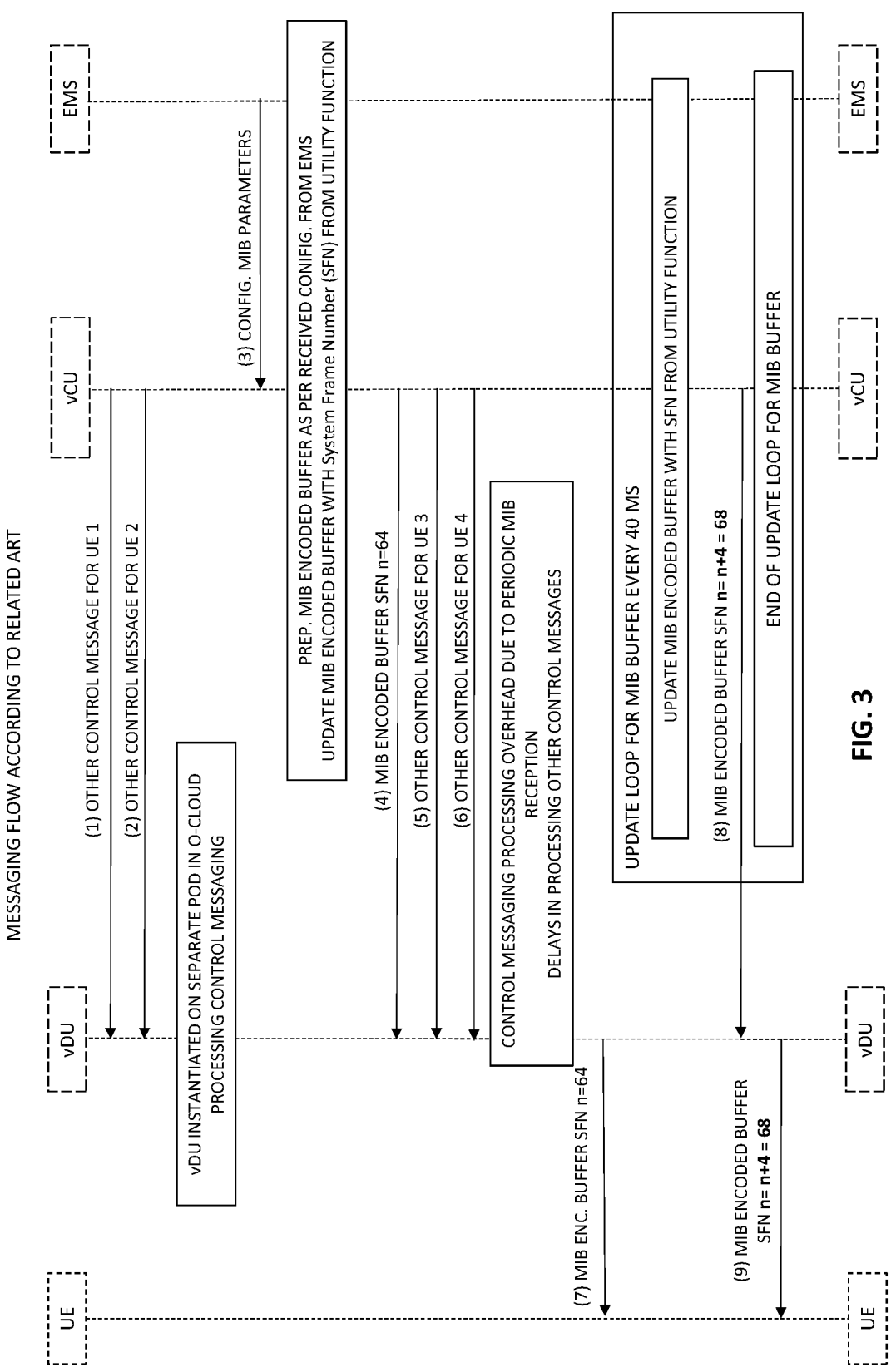

MESSAGING FLOW ACCORDING TO RELATED ART vDU INSTANTIATED ON SEPARATE POD IN O-CLOUD PROCESSING CONTROL MESSAGING (1) OTHER CONTROL MESSAGE FOR UE 1

(2) OTHER CONTROL MESSAGE FOR UE 2

(3) CONFIG. MIB PARAMETERS

PREP. MIB ENCODED BUFFER AS PER RECEIVED CONIFG. FROM EMS
UPDATE MIB ENCODED BUFFER WITH System Frame Number (SFN) FROM UTILITY FUNCTION (4) MIB ENCODED BUFFER SFN n=64

(5) OTHER CONTROL MESSAGE FOR UE 3

(6) OTHER CONTROL MESSAGE FOR UE 4

CONTROL MESSAGING PROCESSING OVERHEAD DUE TO PERIODIC MIB RECEPTION
DELAYS IN PROCESSING OTHER CONTROL MESSAGES (7) MIB ENC. BUFFER SFN n=64

UPDATE LOOP FOR MIB BUFFER

UPDATE LOOP FOR MIB BUFFER EVERY 40 MS

UPDATE MIB ENCODED BUFFER WITH SFN FROM UTILITY FUNCTION (8) MIB ENCODED BUFFER SFN n= n+4 = 68

END OF UPDATE LOOP FOR MIB BUFFER (9) MIB ENCODED BUFFER SFN n= n+4 = 68

EMS vCU vDU

UE

EMS vCU vDU

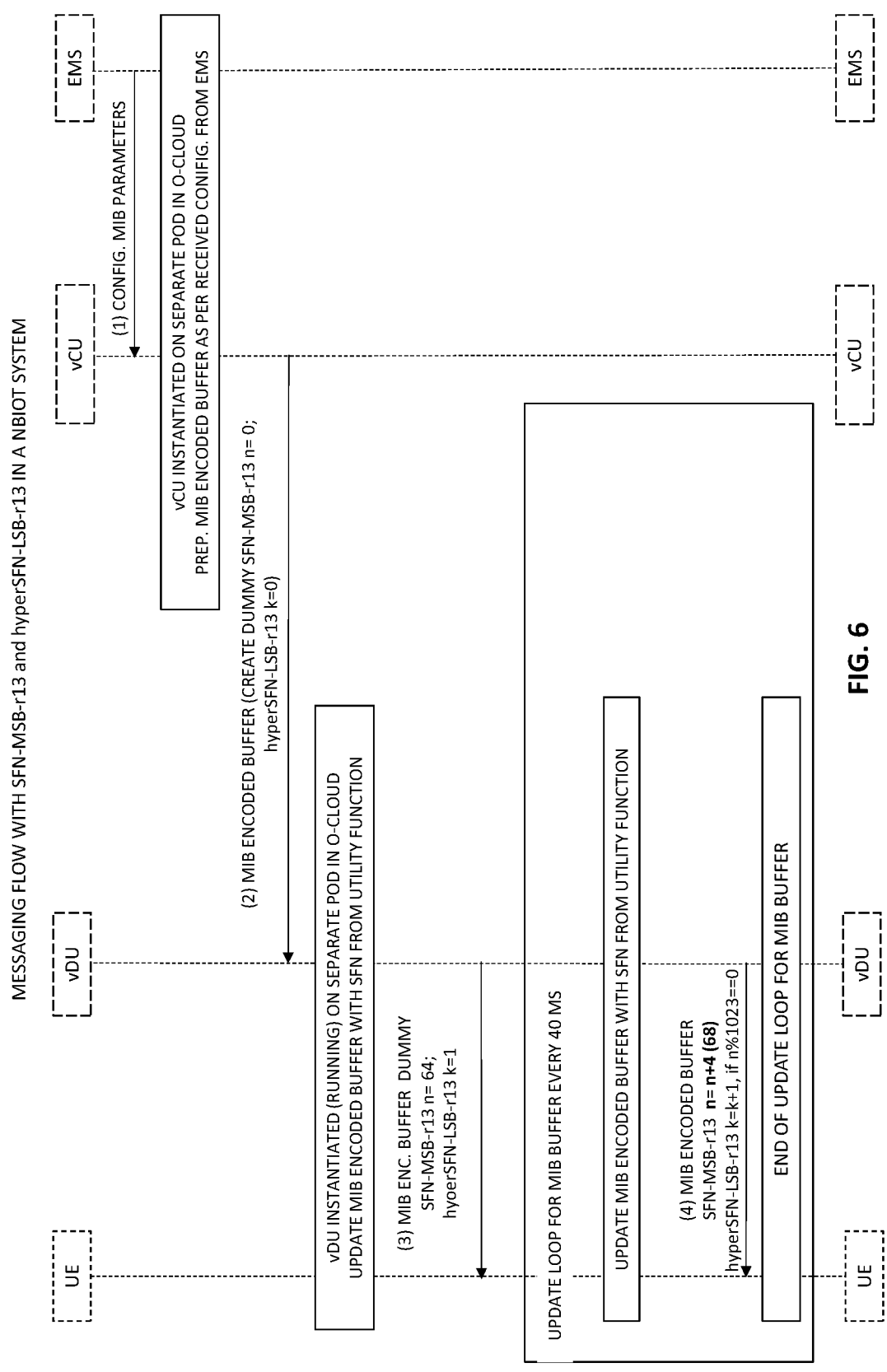

MESSAGING FLOW WITH SFN-MSB-r13 and hyperSFN-LSB-r13 IN A NBIOT SYSTEM

EMS vCU (1) CONFIG. MIB PARAMETERS vCU INSTANTIATED ON SEPARATE POD IN O-CLOUD
PREP. MIB ENCODED BUFFER AS PER RECEIVED CONFIG. FROM EMS (2) MIB ENCODED BUFFER (CREATE DUMMY SFN-MSB-r13 n= 0;
hyperSFN-LSB-r13 k=0)

vDU vDU INSTANTIATED (RUNNING) ON SEPARATE POD IN O-CLOUD
UPDATE MIB ENCODED BUFFER WITH SFN FROM UTILITY FUNCTION (3) MIB ENC. BUFFER  DUMMY
SFN-MSB-r13 n= 64;
hyoerSFN-LSB-r13 k=1

UPDATE LOOP FOR MIB BUFFER EVERY 40 MS

UPDATE MIB ENCODED BUFFER WITH SFN FROM UTILITY FUNCTION (4) MIB ENCODED BUFFER
SFN-MSB-r13  n= n+4 (68)
hyperSFN-LSB-r13 k=k+1, if n%1023==0

END OF UPDATE LOOP FOR MIB BUFFER

UE

EMS vCU vDU

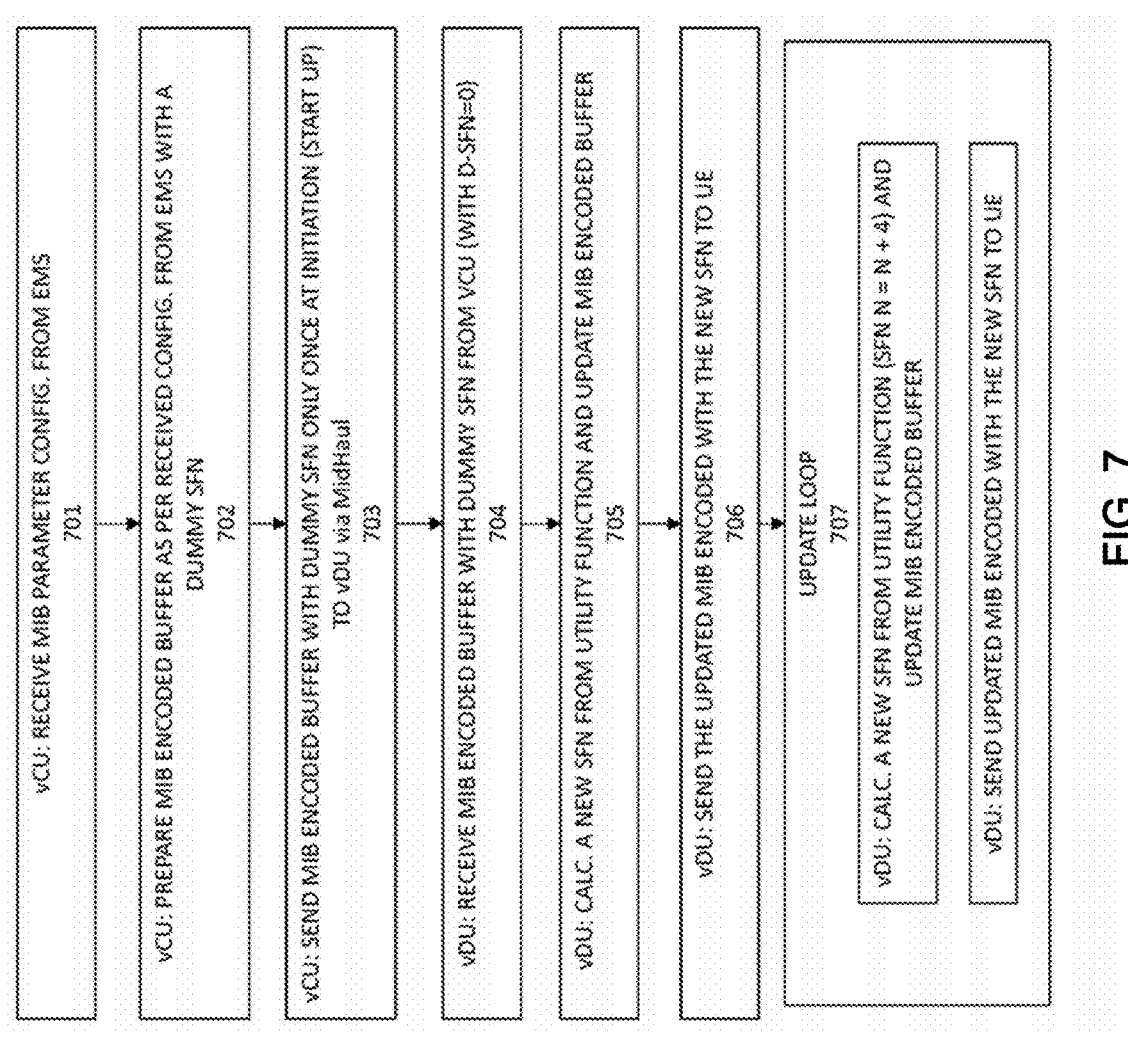

vCU: RECEIVE MIB PARAMETER CONFIG. FROM EMS
701 vCU: PREPARE MIB ENCODED BUFFER AS PER RECEIVED CONFIG. FROM EMS WITH A DUMMY SFN
702 vCU: SEND MIB ENCODED BUFFER WITH DUMMY SFN ONLY ONCE AT INITIATION (START UP) TO vDU via MidHaul
703 vDU: RECEIVE MIB ENCODED BUFFER WITH DUMMY SFN FROM VCU (WITH D-SFN=0)
704 vDU: CALC. A NEW SFN FROM UTILITY FUNCTION AND UPDATE MIB ENCODED BUFFER
705 vDU: SEND THE UPDATED MIB ENCODED WITH THE NEW SFN TO UE
706

UPDATE LOOP
707 vDU: CALC. A NEW SFN FROM UTILITY FUNCTION (SFN N = N + 4) AND UPDATE MIB ENCODED BUFFER vDU: SEND UPDATED MIB ENCODED WITH THE NEW SFN TO UE

FIG. 7

SYSTEMS AND METHODS FOR DYNAMIC CONTENT HANDLING OF INTER-LAYER MESSAGES IN A POD BASED CLOUD NATIVE ENVIRONMENT

CROSS REFERENCE TO RELATED APPLICATIONS

This application is a National Stage of International Application No. PCT/US2023/012253, filed Feb. 3, 2023.

TECHNICAL FIELD

Apparatuses and methods consistent with example embodiments of the present disclosure relate to the implementation dynamic content handling of inter-layer messages in a pod based cloud native environment of a telecommunications network.

BACKGROUND

In the related art, a Master Information Block (MIB) is an information message that is broadcasted from an Evolved-UMTS Terrestrial Radio Access Network (E-UTRAN) (e.g., a Long Term Evolution (LTE) or a Narrowband Internet Of Things (NBIOT)) eNodeB (eNB) to a user entity (UE). In particular, the MIB is the first among other system information blocks (SIB) broadcasted, from the E-UTRAN to the UE via the eNB.

FIG. 1A illustrates a Radio Access Network (RAN) architecture implementing an E-UTRAN functionality in a common (non-split) eNB software function according to the related (i.e., in the same common RAN node software function (i.e., the eNB)). Referring to FIG. 1A, the RAN node (i.e., eNB) software function does not split the architecture with regard to the Radio Resource Control (RRC) protocol, Radio Resource Management (RRM), Mobility Management (MM), Self-Organizing Networks (SON), LTE Evolved Packet Core (EPC) interfaces (e.g., S1-U, S1-MMe, etc.), X2 interface, IpSEs, OAM, Syslog, etc. and the Upper physical (PHY) network layers such as the media access control (MAC) and radio link control (RLC) layers.

As a result, all content of the MIB (except a System Frame Number (SFN)) is configured by an operator through an Element Management System (EMS) (e.g., via a graphic user interface EMS GUI of a virtualized EMS (vEMS)) and communicated to the eNB software function. The eNB encodes the information as per configuration and calculates the SFN by the synchronized time from an utility function using the epoch time as a base and sends it to UE directly. To this end, the eNB communicates with the radio interface unit (RIU) via a Common Public Radio Interface (CPRI) (e.g., an enhanced CPRI) that sends the MIB and the plurality of SIBs to the UE.

FIG. 1B illustrates a Radio Access Network (RAN) architecture implementing a split of E-UTRAN functionality in vCU and vDU according to the related art. Referring to FIG. 1B, the E-UTRAN functionality (i.e., network functions of the eNB as set forth in FIG. 1A) is split into network functions such as a Central Unit CU (i.e., a virtual CU (vCU)) and the distribution unit DU (i.e., a virtual DU (vDU)). Similar to FIG. 1A, all content of the MIB (except SFN) is configured by an operator through an Element management system (EMS) (e.g., a virtualized EMS (vEMS)) in FIG. 1B. The vEMS communicates the MIB configuration parameters (i.e., at least one parameter) to the vCU. The vCU encodes the information as per configuration and calculates the SFN by the synchronized time from the utility function using the epoch time as a base. The vCU communicates with the vDU via a Midhaul (e.g., sends an MIB encoded buffer to the vDU). The vCU and the vDU may be hosted in separate pods in a cloud native environment of a telecommunications network. The vDU communicates (e.g., forwards the MIB encoded buffer) to a radio interface unit (RIU) (e.g., an O-RU) via the CPRI (e.g., the eCPRI) that sends the MIB and the plurality of SIBs to a UE (e.g., at least one UE).

FIG. 2A illustrates a MIB messaging flow from the E-UTRAN to the UE via an eNB according to the related art, and FIG. 2B illustrates a MIB messaging flow from the E-UTRAN to the UE via a Midhaul between the vCU and the vDU hosted on separate pods in a cloud native environment according to the related art.

Referring to FIGS. 2A and 2B, the MIB, (e.g., in a LTE system) is transmitted on a downlink Physical Broadcast Channel (PBCH). The MIB is a 24-bit information message comprising the following information: 3 bits for system bandwidth, 3 bits for PHICH information, 1 bit to indicate normal or extended Physical channel HybridARQ Indicator Channel (PHICH), 2 bits to indicate the PHICH Allocation (i.e., an Ng value), 8 bits for system frame number (SFN).

For example, in the LTE system, in accordance with 3GPP TS 36.911 [91], 6.6.1, the 2 least significant bits of the SFN are acquired implicitly in the PBCH decoding (i.e., the timing of 40 ms P-BCH Transmission Time Interval (TTI) indicates 2 least significant bits (e.g., within a 40 ms PBCH TTI, a first radio frame RF: 00, a second radio frame RF: 01, a third radio frame RF: 10, a fourth (last) radio frame RF: 11)). Moreover, in the LTE system, each radio frame (RF) is 10 ms in length. One value applies for all serving cells of a cell group (i.e., a Master Cell Group (MCG) or a Secondary Cell Group (SCG)). The associated functionality is common (i.e., not performed independently for each cell). The base station (e.g., the eNB) allocates the SFN for each RF in the manner specified by, for example, a Radio Resource Control (RRC) protocol. The SFN ranges from 0 to 1023.

In another example, in case of a Narrowband Internet of things (NBIOT), in accordance with 3GPP TS 36.911 [91], a System Frame Number-MSB (SFN-MSB) defines the 4 most significant bits of the SFN. As indicated in TS 36.911 [91], in the NBIOT system, the 6 least significant bits of the SFN are acquired implicitly by decoding the narrow band physical broadcast channel (NPBCH) (i.e., NPBCH is similar to PBCH in a LTE system as set forth above). The SFN, in the NBIOT, is defined as a System Frame Number-MSB-r13 (SFN-MSB-r13).

Moreover, in the NBIOT system (similar to the LTE system) each radio frame is 10 ms in length. The NBIOT base station (e.g., the eNB) allocates a SFN (i.e., a SFN-MSB-r13) for each radio frame (RF) in the manner specified by a protocol. In the NBIOT system, the SFN ranges from 0 to 1023.

Moreover, in the NBIOT system, a hyper SFN least significant bit (hyperSFN-LSB) such as a hyperSFN-LSB-r13 indicates the 2 least significant bits of a hyper SFN, wherein the remaining bits are present in System Information Block Type 1 Narrow Band (NB) (SIB Type1-NB).

In addition to the System Frame Number-MSB-r13 and the hyperSFN-LSB-r13, the NBIOT defines a Hyper Frame Number or Hyper SFN (HFN). For NBIOT requirements, the HFN is a timer at the next level to the SFN. In comparison to the SFN in the LTE system, the HFN ranges between 0 and 1023, and the HFN value increases by 1 when SFN reaches n=1023 and resets to 0.

According to the related art, in the LTE system and the NBIOT system, the SFN is transmitted, for example, from the eNB to the UE in the MIB for mainly two reasons, one, for initial synchronization and two for periodic synchronization between the eNB and the UE to avoid any drifts of its timing versus the eNB's timing (i.e., the epoch timing provided from a utility function to the eNB).

To this end, in the LTE system and the NBIOT system, the MIB provides a SFN generation periodicity and a transmission periodicity.

The SFN generation periodicity refers to the loop duration between two consecutive MIB information messages generated by higher network layers at the base station (e.g., eNB). The SFN generation periodicity is 40 ms, wherein the physical network layer receives new MIBs (i.e., MIB with different SFNs) for encoding every 40 ms. The SFN within each MIB keeps changing every MIB, but other contents of the MIB may or may not change.

The transmission periodicity refers to the duration between two consecutive PBCH transmissions by the physical layer (i.e., two consecutive NPBCH transmissions in the NBIOT system). The physical layer transmits the PBCH (i.e., NPBCH) every 10 ms. Although the contents of 4 consecutive PBCHs remain the same because the PBCH carries the MIB, the MIB cannot change until 40 ms after the first PBCH (i.e., NPBCH) transmission.

With regard to the above functions, in the LTE system and the NBIOT system, the MIB is paramount for a UE to synchronize with the base station (e.g., the eNB or the NBIOT base station). To this end, the UE needs to acquire the MIB before it can start any transaction with the eNB because the MIB provides all the vital information as set forth above. For acquiring the MIB, base station may transmit the SFN via the PBCH, wherein the SFN remains the same for 4 radio frames (RF). Similarly, the 4 consecutive radio frames transmit the same MIB information. The UE knows the SFN generation periodicity has a loop duration of 40 ms and detects 4 consecutive SFNs that are the same (i.e., detects 4 radio frames with the same SFN).

For example, in a best-case scenario according to the related art (e.g., in the LTE system and the NBIOT system), a UE starts decoding the MIB from a first radio frame RF: 00. Thus, the UE is going to detect the same SFN for 4 consecutive radio frames (i.e., RF: 01, RF: 10, and RF: 11, respectively). Thereby, the UE understands that the first radio RF: 00 was the start of the 40 ms loop duration of the SFN generation periodicity.

However, in a worst-case scenario according to the related art (e.g., in the LTE system and the NBIOT system), the UE decodes the second radio frame RF: 01. In this case, 3 consecutive radio frames (i.e., RF: 01, RF: 10, and RF: 11) have the same SFN and the fourth radio frame has a different SFN (i.e., RF: 00 with a new SFN). In this case, the UE continues decoding the PBCH (i.e., the NPBCH in the NBIOT system) till a further 4 consecutive radio frames with the same SFN have been received and then decides that a start marker for the 40 ms loop duration of the SFN generation periodicity was detected.

Referring to FIG. 2A, according to the architecture of FIG. 1A, the whole E-UTRAN functionality runs on same hardware as a common software entity (e.g., on a RAN node such as an eNB). In operation 1, the EMS sends the MIB configuration parameters to the eNB. In operation 2, the eNB prepares the MIB encoded buffer as per the received configuration from EMS (i.e., Function (A)) and updates the MIB encoded buffer with a SFN from the utility function (i.e., Function (B)). In operation 2, the eNB sends the MIB encoded buffer including the SFN to the UE via the RIU. Moreover, according to the SFN generation periodicity as set forth above, the eNB commences a loop operation that updates the MIB encoded buffer with a new SFN (i.e., a SFN n=n+4) from the utility function every 40 ms. In operation 3, the eNB sends the updated MIB encoded buffer with the new SFN to the UE via the RIU.

As a result, in the related art (e.g., in the LTE system and the NBIOT system) according to FIG. 1A and FIG. 2A (i.e., the eNB hardware operates as a common software entity), a UE can decode the MIB every 40 ms (loop duration of the SFN generation periodicity) in a minimum of 40 ms for the best case and a maximum of 70 ms for the worst case.

Referring to FIG. 2B, according to the architecture of FIG. 1B, the RAN node functionality (i.e., eNB functionality) is split into vCU and vDU network functions. The vCU and VDU are instantiated (running) on separate pods in the cloud native environment (e.g., the O-Cloud of an O-RAN). In operation 1, the EMS sends the MIB configuration parameters to the vCU. In operation 2, the vCU prepares the MIB encoded buffer as per the received configuration from EMS (i.e., Function (A) of FIG. 2A) and updates the MIB encoded buffer with a SFN from the utility function (i.e., Function (B) of FIG. 2A) and sends the MIB encoded buffer to the vDU via the Midhaul. In operation 3, in accordance with FIG. 1B, the vDU forwards MIB encoded buffer of the vCU to the UE via the RIU (i.e., an O-RU). Moreover, according to the SFN generation periodicity as set forth above, the vCU commences a loop operation that updates the MIB encoded buffer with a new SFN (i.e., a SFN n=n+4) from the utility function every 40 ms. To this end, in operation 4, the vCU sends an updated MIB encoded buffer with a new SFN (i.e., a SFN n=n+4) every 40 ms to the vDU. In operation 5, upon receipt of the updated the MIB encoded buffer with the new SFN via the Midhaul, the vDU forwards the updated MIB encoded buffer with the new SFN to the UE via the RIU.

To this end, referring to FIG. 2B, the worst-case scenario for a UE to decode a MIB may be even more challenging due to Midhaul transmission issues between the vCU and the vDU such as messaging congestion (e.g., MIB/SIB message overflow) or network infrastructure issues (e.g., network communication problems between the physical hosts (e.g., server(s), server cluster(s), etc.) running the vCU and the vDU).

As a result, in the related art according to FIGS. 1B and 2B, the best-and worst-case scenarios as set forth in FIGS. 1A and 2A may not be achieved within minimum and maximum time and unacceptable latency delays resulting in high error rates may be introduced by the split into network functions in terms of vCU and vDU functionality hosted in separate pods in a cloud native environment.

SUMMARY

According to embodiments, systems and methods are provided for implementing dynamic content handling of a MIB RRC protocol message during its transmission from a vCU to a vDU network function according to which the periodic SFN generation is shifted downstream from the vCU to the vDU network function without introducing an operational burden to the vDU.

In particular, the systems and methods allow the vDU to send the SFN to the UE without any delays due to messaging congestion or network issues in the Midhaul between the vCU and vDU that allows the UE to synchronize without unforeseeable high latency delays.

As a result, the error rates due to delays in acquiring the MIB (e.g., the synchronization of the UE and the base station (e.g., the eNB (vDU/vCU)) introduced by the split into network functions in terms of vCU and vDU RAN network functionality can be minimized. This leads to more robust and lower latency operation of the RAN.

According to embodiments, a system for implementing dynamic content handling of inter layer messages in a pod based cloud native environment of a telecommunications network, the system includes: at least one memory storing instructions; and at least one processor configured to execute the instructions to: receive, by a virtual centralized unit (vCU), at least one Master Information Block (MIB) parameter configured by a virtual element management system (vEMS); prepare, by the vCU, a MIB encoded buffer may include a Dummy System Frame Number (D-SFN); send, by the vCU, once at the time of startup initiation, the MIB encoded buffer with the D-SFN to a virtual distributed unit (vDU) via a Midhaul between the vCU and the vDU; receive, by the vDU, the MIB encoded buffer with the D-SFN via the Midhaul from the vCU; for each received MIB encoded buffer from the vCU, by the vDU, calculate a new SFN from an utility function; update the MIB encoded buffer; and send the updated MIB encoded buffer with the new SFN from the utility function to at least one user entity (UE).

The at least one processor may be further configured to execute the instructions to: update, by the vDU, the D-SFN with the new SFN at fixed offset position that is pre-shared by the vCU and the vDU.

The D-SFN and the new SFN are an 8 bit SFN of a LTE system.

The D-SFN and the new SFN may include of a SFN-MSB-r13 and a hyperSFN-LSB-r13 of a NBIOT system.

The vCU is hosted in a pod based cloud native environment for implementing dynamic content handling of inter layer messages in the pod based cloud native environment of a telecommunications network, the pod based cloud native environment hosting the vCU may include: at least one memory storing instructions; and at least one processor configured to execute the instructions to: receive, by the vCU, at least one Master Information Block (MIB) parameter configured by a virtual element management system (vEMS); prepare, by the vCU, a MIB encoded buffer may include a Dummy System Frame Number (D-SFN); send, by the vCU, once at the time of startup initiation, the MIB encoded buffer with the D-SFN to a virtual distributed unit (vDU) via a Midhaul between the vCU and the vDU.

The vDU is hosted in a pod based cloud native environment for implementing dynamic content handling of inter layer messages in the pod based cloud native environment of a telecommunications network, the pod based cloud native environment hosting the vDU may include: at least one memory storing instructions; and at least one processor configured to execute the instructions to: receive, by the vDU, the MIB encoded buffer with the D-SFN via a Midhaul from a virtual centralized unit (vCU); for each received MIB encoded buffer from the vCU, by the vDU, calculate a new SFN from an utility function; update the MIB encoded buffer; and send the updated MIB encoded buffer with the new SFN from the utility function to at least one user entity (UE).

According to embodiments, a method for implementing dynamic content handling of inter layer messages in a pod based cloud native environment of a telecommunications network, the method includes: receiving, by a virtual centralized unit (vCU), at least one Master Information Block (MIB) parameter configured by a virtual element management system (vEMS); preparing, by the vCU, a MIB encoded buffer may include a Dummy System Frame Number (D-SFN); sending, by the vCU, once at the time of startup initiation, the MIB encoded buffer with the D-SFN to a virtual distributed unit (vDU) via a Midhaul between the vCU and the vDU; receiving, by the vDU, the MIB encoded buffer with the D-SFN via the Midhaul from the vCU; for each received MIB encoded buffer from the vCU, by the vDU, calculate a new SFN from an utility function; update the MIB encoded buffer; and sending the updated MIB encoded buffer with the new SFN from the utility function to at least one user entity (UE).

The method may include updating, by the vDU, the D-SFN with the new SFN at fixed offset position that is pre-shared by the vCU and the vDU.

The D-SFN and the new SFN are an 8 bit SFN of a LTE system.

The D-SFN and the new SFN may include of a SFN-MSB-r13 and a hyperSFN-LSB-r13 of a NBIOT system.

The vCU is hosted in a pod based cloud native environment for implementing dynamic content handling of inter layer messages in the pod based cloud native environment of a telecommunications network, the method may include: receiving, by the vCU, at least one Master Information Block (MIB) parameter configured by a virtual element management system (vEMS); preparing, by the vCU, a MIB encoded buffer may include a Dummy System Frame Number (D-SFN); sending, by the vCU, once at the time of startup initiation, the MIB encoded buffer with the D-SFN to a virtual distributed unit (vDU) via a Midhaul between the vCU and the vDU.

The vDU is hosted in a pod based cloud native environment for implementing dynamic content handling of inter layer messages in the pod based cloud native environment of a telecommunications network, the method may include: receiving, by the vDU, the MIB encoded buffer with the D-SFN via a Midhaul from a virtual centralized unit (vCU); for each received MIB encoded buffer from the vCU, by the vDU, calculating a new SFN from an utility function; updating the MIB encoded buffer; and sending the updated MIB encoded buffer with the new SFN from the utility function to at least one user entity (UE)

According to embodiments, a non-transitory computer-readable recording medium having recorded thereon instructions executable by at least one processor configured to perform a method for implementing dynamic content handling of inter layer messages in a pod based cloud native environment of a telecommunications network, the method includes: receiving, by a virtual centralized unit (vCU), at least one Master Information Block (MIB) parameter configured by a virtual element management system (vEMS); preparing, by the vCU, a MIB encoded buffer may include a dummy System Frame Number (D-SFN); sending, by the vCU, once at the time of startup initiation, the MIB encoded buffer with the D-SFN to a virtual distributed unit (vDU) via a Midhaul between the vCU and the vDU; receiving, by the vDU, the MIB encoded buffer with the D-SFN via the Midhaul from the vCU; for each received MIB encoded buffer from the vCU, by the vDU, calculate a new SFN from an utility function; update the MIB encoded buffer; and sending the updated MIB encoded buffer with the new SFN from the utility function to at least one user entity (UE).

The non-transitory computer-readable recording medium having recorded thereon instructions executable by at least one processor configured to perform a method that may include updating, by the vDU, the D-SFN with the new SFN at fixed offset position that is pre-shared by the vCU and the vDU.

The D-SFN and the new SFN are an 8 bit SFN of a LTE system.

The D-SFN and the new SFN may include of a SFN-MSB-r13 and a hyperSFN-LSB-r13 of a NBIOT system.

The instructions executable by at least one processor may be configured to implement the vCU to perform a method for implementing dynamic content handling of inter layer messages in a pod based cloud native environment of a telecommunications network, the method may include: receiving, by the vCU, at least one Master Information Block (MIB) parameter configured by a virtual element management system (vEMS); preparing, by the vCU, a MIB encoded buffer may include a Dummy System Frame Number (D-SFN); sending, by the vCU, once at the time of startup initiation, the MIB encoded buffer with the D-SFN to a virtual distributed unit (vDU) via a Midhaul between the vCU and the vDU.

The instructions executable by at least one processor may be configured to implement the vDU to perform a method for implementing dynamic content handling of inter layer messages in a pod based cloud native environment of a telecommunications network, the method may include: receiving, by the vDU, the MIB encoded buffer with the D-SFN via a Midhaul from a virtual centralized unit (vCU); for each received MIB encoded buffer from the vCU, by the vDU, calculating a new SFN from an utility function; updating the MIB encoded buffer; and sending the updated MIB encoded buffer with the new SFN from the utility function to at least one user entity (UE).

Additional aspects will be set forth in part in the description that follows and, in part, will be apparent from the description, or may be realized by practice of the presented embodiments of the disclosure.

BRIEF DESCRIPTION OF THE DRAWINGS

Features, aspects and advantages of certain exemplary embodiments of the disclosure will be described below with reference to the accompanying drawings, in which like reference numerals denote like elements, and wherein:

FIG. 2A illustrates a MIB messaging flow from the E-UTRAN to the UE via an eNB according to the related art;

FIG. 2B illustrates a MIB messaging flow from the E-UTRAN to the UE via a Midhaul between the vCU and the vDU hosted on separate pods in a cloud native environment according to the related art;

FIG. 3 illustrates a MIB messaging flow via the vCU/vDU Midhaul referring to a MIB transmission delay due to a communication issue based on a package overflow;

FIG. 6 illustrates a MIB-NB messaging flow for NBIOT System via the vCU/vDU Midhaul according to another example embodiment;

FIG. 7 illustrates a MIB messaging flow via the vCU/vDU Midhaul according to an embodiment;

DETAILED DESCRIPTION

Figure 1A:
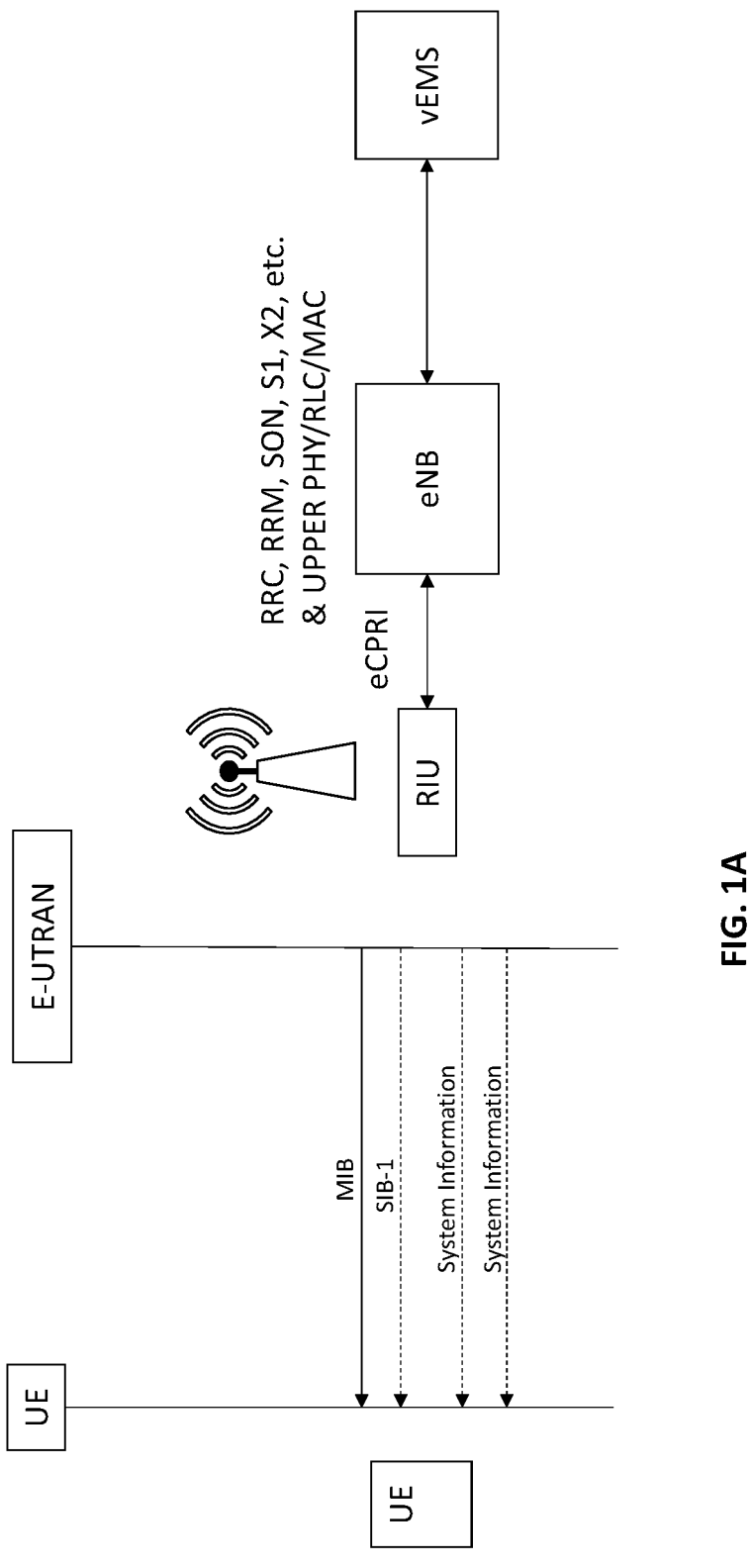
FIG. 1A illustrates a Radio Access Network (RAN) architecture implementing an E-UTRAN functionality in a common (non-split) eNB software function according to the related art.

The following detailed description of example embodiments refers to the accompanying drawings. The foregoing disclosure provides illustration and description but is not intended to be exhaustive or to limit the implementations to the precise form disclosed. Modifications and variations are possible in light of the above disclosure or may be acquired from practice of the implementations. Further, one or more features or components of one embodiment may be incorporated into or combined with another embodiment (or one or more features of another embodiment). Additionally, in the flowcharts and descriptions of operations provided below, it is understood that one or more operations may be omitted, one or more operations may be added, one or more operations may be performed simultaneously (at least in part), and the order of one or more operations may be switched.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code. It is understood that software and hardware may be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Where only one item is intended, the term "one" or similar language is used. Also, as used herein, the terms "has," "have," "having," "include," "including," or the like are intended to be open-ended terms. Further, the phrase "based on" is intended to mean "based, at least in part, on" unless explicitly stated otherwise. Furthermore, expressions such as "at least one of [A] and [B]" or "at least one of [A] or [B]" are to be understood as including only A, only B, or both A and B.

Example embodiments of the present disclosure provide a method and system in which the periodic SFN generation is shifted downstream from the vCU to the vDU network function without introducing an operational burden to the vDU. As a result, the delays due to messaging congestion or network issues in the Midhaul between the vCU and vDU can be avoided which allows for a more robust and low latency operation of the RAN.

FIG. 3 illustrates a MIB messaging flow via the vCU/vDU Midhaul referring to a MIB transmission delay due to a communication issue based on a package overflow. The vCU and vDU are hosted (i.e., running) in (separate) different pods in the cloud native environment. Referring to FIG. 3, in operations 1 and 2, the communication between vCU and vDU via the Midhaul may be time sensitive and a plurality of control messages (e.g., for a first UE 1 and/or a second UE2) are sent from vCU to the vDU.

The control messages may be related to network functionality that resides in the vDU (e.g., the PHY, MAC, and RLC sublayers) and/or other sublayers residing in the vCU (e.g., Packet Data Convergence Protocol (PDCP), Radio Resource Management (RRM), Radio Resource Control (RRC) protocol, etc.). To this end, time-sensitive control messages may need priority processing at the vDU which is paramount for the robustness of the RAN operation and to meet the latency requirements thereto.

In operation 3, the EMS (i.e., vEMS) sends a configuration of MIB parameters to the vCU. Upon receipt, the vCU prepares the MIB encoded buffer as per the received configuration parameters from EMS and updates the MIB encoded buffer with a SFN. The SFN may be created from a (RAN) system time provided by a utility function (i.e., the utility function may provide time using the epoch time as a base).

In operation 4, the vCU sends the MIB encoded buffer with the SFN (e.g., SFN n=64) to the vDU. Moreover, in accordance with FIG. 2B, the vCU sends, in a loop operation for updating the MIB encoded buffer with a new SFN, the MIB encoded buffer with the new SFN every 40 ms.

Subsequently, in operations 5 and 6, the vCU sends time-sensitive control messages for a plurality of UEs to the vDU. In this case, the vDU may have to queue the control messages sent in operations 5 and 6 to process the MIB encoded buffer with SFN n=64, respectively. To this end, the control messaging overhead due to periodic MIB reception (i.e., the loop operation for updating the MIB encoded buffer with the SFN as set forth in FIG. 2B) delays in processing other control messages (e.g., UE5 and UE6 control messages) and causes a delay in Midhaul transmissions towards the UEs.

As a result, by sending the MIB encoded buffer with respective SFN from vCU to vDU every 40 ms leads to control messaging overhead (message congestion) in the system that causes many time-sensitive control messages to be buffered in a receiving queue of the common entity (i.e., the vDU) may lead to delays in processing other control messages.

In operation 7, the vDU sends (forwards) the MIB encoded buffer with SFN (e.g., SFN n=64). In operation 8, the vCu commences another loop operation for updating the MIB encoded buffer with a new SFN (e.g., SFN n=n+4=68), sends the MIB encoded buffer with the new SFN to the vDU, and thereby, again causing control messaging overhead on the Midhaul. In operation 9, the vDU sends (forwards) the MIB encoded buffer with the new SFN (e.g., a SFN n=68) towards the UE.

Figure 4:
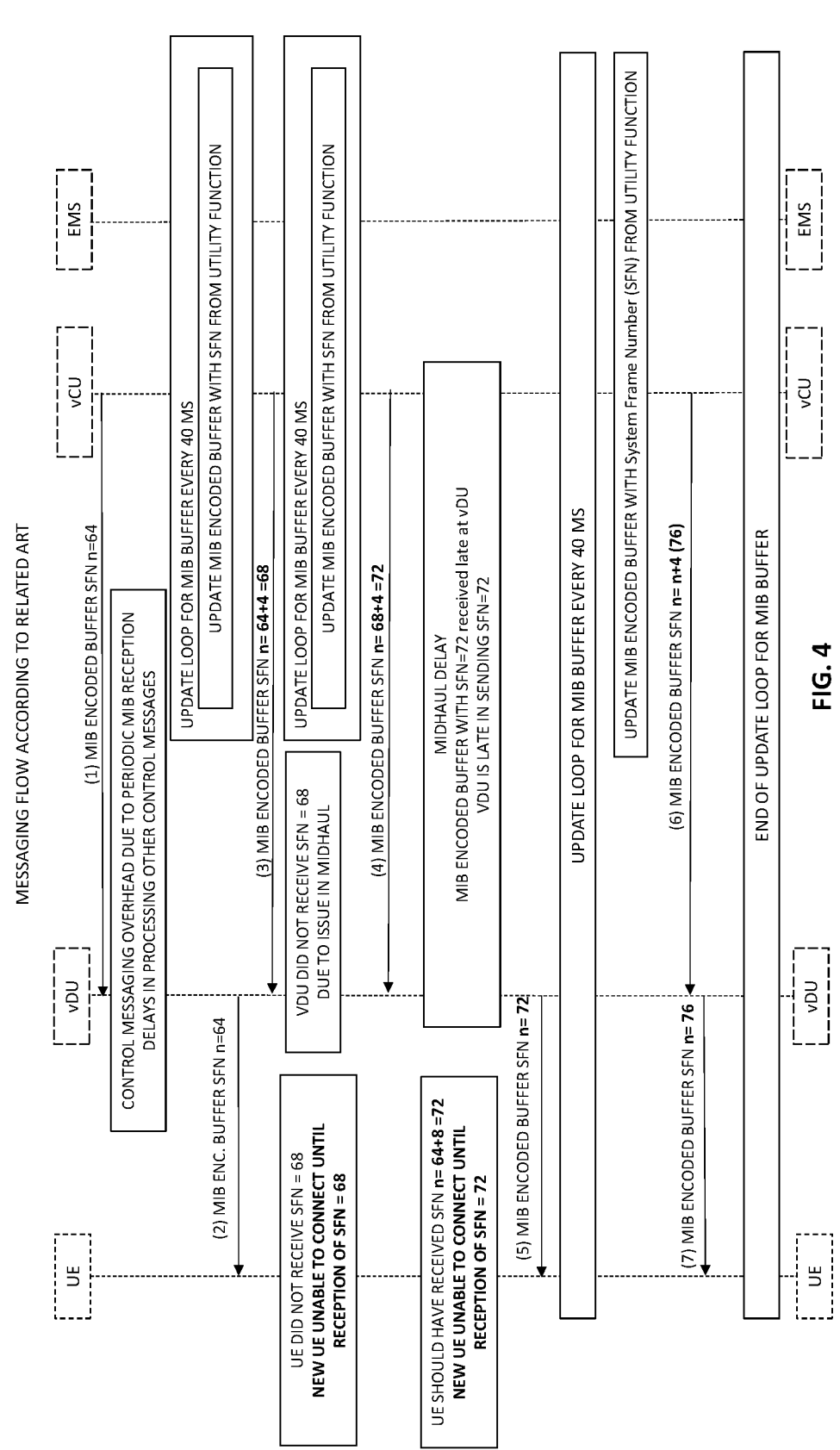
FIG. 4 illustrates a MIB messaging flow via the vCU/vDU Midhaul referring to a MIB transmission delay due to a network infrastructure problem.

FIG. 4 illustrates a MIB messaging flow via the vCU/vDU Midhaul referring to a MIB transmission delay due to a network infrastructure problem. Referring to FIG. 4, in operation 1, the EMS (i.e., vEMS) sends a configuration of MIB parameters to the vCU. Upon receipt, the vCU prepares the MIB encoded buffer as per the received configuration parameters from EMS and updates the MIB encoded buffer with a SFN. In operation 2, the vCU sends the MIB encoded buffer with a SFN (e.g., SFN n=64) to the vDU. Subsequently, in operation 3, the vCU sends an updated MIB encoded buffer with new SFN (e.g., SFN n=n+4=68) to the vDU. Similar to FIG. 3, the periodic sending of the MIB encoded buffer with the new SFN every 40 ms causes a control messaging overhead. In addition, due to network infrastructure issues such as, for example, internet fluctuations, latency problems, package loss, traffic problems, etc. due to network infrastructure or Cloud infrastructure problems the vDU may not receive the updated MIB encoded buffer with the new SFN (e.g., SFN n=n+4=68). In this case, the vDU is unable to forward the updated MIB encoded buffer with the new SFN (e.g., SFN n=n+4=68) to the UE. As a result, the UE does not receive SFN=68 (i.e., in case of a new UE that acquires synchronization, the new UE cannot be connected to the RAN (e.g., the new UE is unable to make calls until further MIB reception).

In operation 4, unaffected by the problems regarding the missed MIB encoded buffer with SFN=68, the vCU continues to update the MIB encoded buffer with a new SFN (e.g., SFN n=n+4=72) and sends it to the vDU.

As a result, the missed MIB encoded buffer with SFN=68 causes a Midhaul delay of the MIB encoded buffer with SFN n=72 and effects the UE to receive the MIB encoded buffer with SFN n=72 late.

In operation 5, the vDU sends (forwards) the MIB encoded buffer with SFN n=72 and the new UE can be connected to the RAN and make calls.

In operation 6, unaffected by the problems regarding the missed MIB encoded buffer with SFN (SFN n=68) and the delay, the vCU continues to further update the MIB encoded buffer with the new SFN (e.g., SFN n=n+4=76), and, in operation 7, the vCU sends MIB encoded buffer with the new SFN (e.g., SFN n=76) to the vDU without regard to the network situation in the Midhaul or the reception of a MIB encoded buffer with SFN at the vDU.

Referring FIGS. 3 and 4, the process of updating the MIB encoded buffer with a new SFN every 40 ms has disadvantages. As set forth above, the periodic generation (updating) of SFNs at the vCU and the respective transmission via the Midhaul leads to an inferior operation of the RAN due to a delay of either other control messages of UEs by the control message overhead created by the periodic updating (i.e., in FIG. 3) or a delay of new UEs connecting to the RAN due to missed MIB messages at the vDU (i.e., in FIG. 4).

Figure 5:
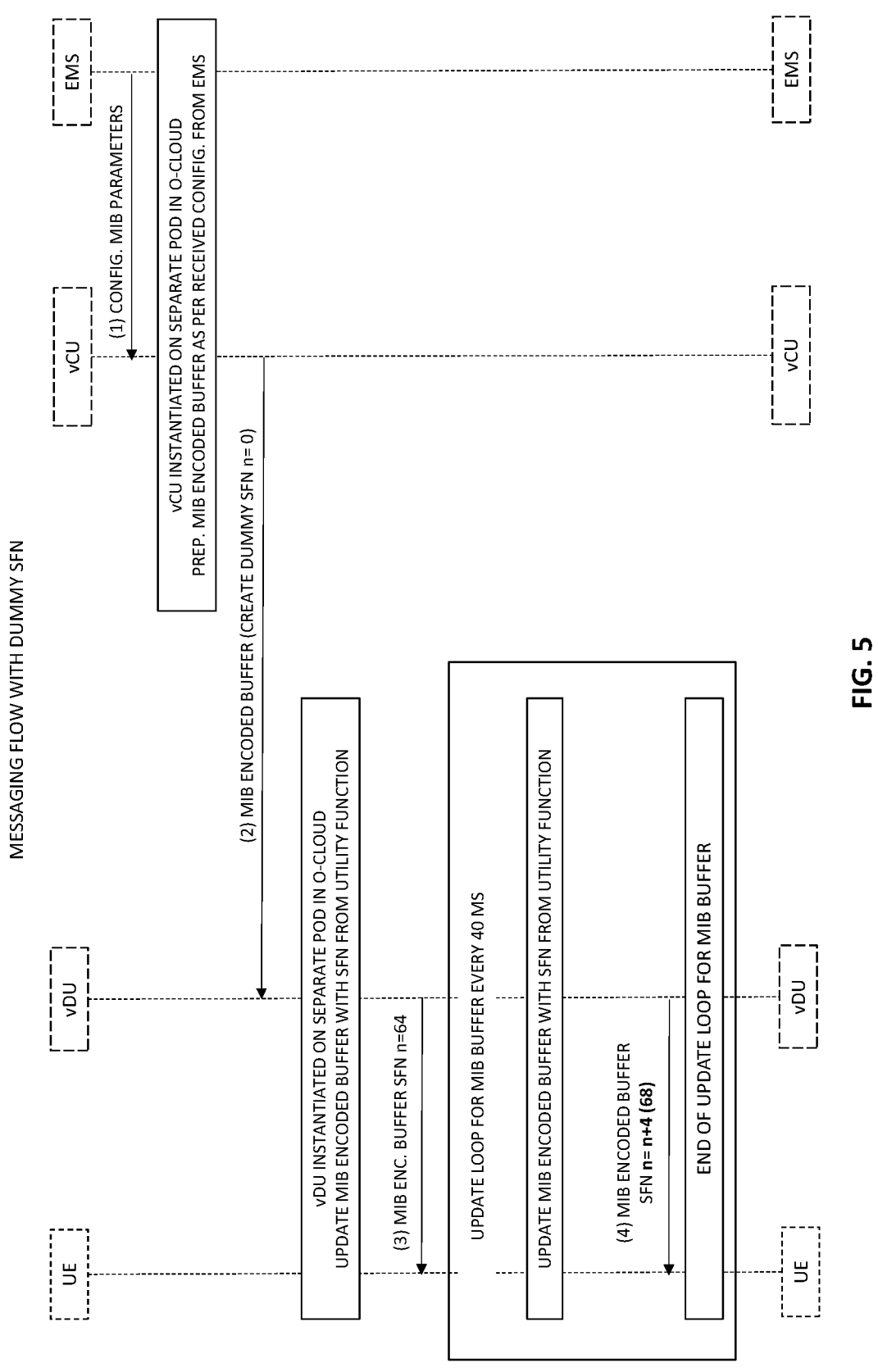
FIG. 5 illustrates a MIB messaging flow via the vCU/vDU Midhaul according to an embodiment.

FIG. 5 illustrates a MIB messaging flow via the vCU/vDU Midhaul according to an embodiment. Referring to FIG. 5, the MIB messaging flow according to the example embodiment refers to a LTE system comprising a vCU and a vDU running in separate pods in the cloud native environment.

In operation 1, the EMS (i.e., vEMS) sends the MIB configuration parameters to the vCU.

In operation 2, the vCU prepares the MIB-encoded buffer according to the configuration received from the EMS and sends the MIB-encoded buffer with a dummy SFN (D-SFN) (i.e., the SFN may be n=0, but may be any number corresponding to the numbering format of the SFN in the LTE system) over the Midhaul to the vDU. The dummy SFN (D-SFN) may be sent only once at the time of startup initiation is not updated at the vCU and remains constant.

In operation 3, upon receiving the MIB-encoded buffer with the dummy SFN from the vCU, the vDU updates the MIB encoded buffer with a SFN from the utility function (i.e., the vDU calculates (creates) a SFN (e.g., updates the SFN at fixed offset position (i.e., a fixed offset position that is pre-shared by vCU and the vDU)) and sends the updated MIB encoded buffer with the calculated (created) SFN (e.g., a SFN n=64) to UE directly, wherein every 1023 radio frames the SFN n is reset to n=0.

To this end, according to the example embodiment, the vDU of the LTE system commences a loop operation that updates the MIB encoded buffer with a new SFN (i.e., a SFN n=n+4) every 40 ms. In particular, the vDU replaces the dummy SFN as received by the vCU in operation 2 by a new SFN in accordance with operation 3 every 40 ms.

In operation 4, according to the loop operation at the vDU, the vDU sends an updated MIB encoded buffer with the newly created SFN (e.g., a SFN n=n+4=68) to the UE.

Referring to FIG. 5, the disadvantage caused by Midhaul transmission issues such as illustrated in FIGS. 3 and 4 can be overcome and the challenges introduced by the split into network functions in terms of vCU and vDU RAN network functionality can be minimized. This leads to more robust and lower latency operation of the RAN.

FIG. 6 illustrates a MIB messaging flow via the vCU/vDU Midhaul according to another example embodiment. Referring to FIG. 6, the MIB messaging flow according to the example embodiment refers to a NBIOT system comprising a vCU and vDU running in separate pods in the cloud native environment.

In operation 1, the EMS (i.e., vEMS) sends the MIB configuration parameters to the vCU.

In operation 2, the vCU prepares the MIB-encoded buffer according to the configuration received from the EMS and sends the MIB-encoded buffer with a dummy SFN (D-SFN) over the Midhaul to the vDU. The dummy SFN may comprising a dummy SFN-MSB-R13 and dummy HYPER-SFN-LSB-R13 (e.g., the dummy SFN-MSB-R13 may be n=0 and the HYPERSFN-LSB-R13 may be k=0, both can be any number corresponding to the numbering format of the SFN-MSB-R13 and the HYPERSFN-LSB-R13 in the NBIOT system). The dummy SFN-MSB-R13 and dummy HYPERSFN-LSB-R13 may be sent only once at the time of startup initiation and are not updated at the vCU (i.e., remain constant).

In operation 3, upon receiving the MIB-encoded buffer with the dummy SFN-MSB-R13 and dummy HYPERSFN-LSB-R13 from the vCU, the vDU updates the MIB encoded buffer with a SFN-MSB-R13 from the utility function (i.e. the vDU calculates the new SFN from a utility function using epoch time as a base and updates it at fixed offset position (i.e., a fixed offset position that is pre-shared by vCU and the vDU) in MIB message encoded buffer and sends the updated MIB encoded buffer with the created SFN (e.g., a SFN n=64) to UE directly. The HYPERSFN-LSB-R13 may be incremented by 1 (e.g., after 1023 radio frames the HYPERSFN-LSB-R13 may be k=1).

To this end, according to example embodiment, the vDU of the NBIOT system commences a loop operation that updates the MIB encoded buffer with a new SFN-MSB-R13 (i.e., SFN-MSB-R13 n=n+4) every 40 ms and a new HYPERSFN-LSB-R13 every n=1023. In particular, the vDU replaces the dummy SFN-MSB-R13 and dummy HYPERSFN-LSB-R13 as received by the vCU in operation 2 by a new SFN-MSB-R13 in accordance with operation 3 every 40 ms (and with a new HYPERSFN-LSB-R13 every n=1023).

In operation 4, according to the loop operation at the vDU, the vDU sends an updated MIB encoded buffer with the new SFN-MSB-R13 (e.g., a SFN-MSB-R13 n=n+4=68) and a new HYPERSFN-LSB-R13 (e.g., HYPERSFN-LSB-R13 k=1 for n% 1023) to the UE.

Referring to FIG. 6, the loop operation that updates the MIB encoded buffer with a new SFN-MSB-R13 (e.g., a SFN-MSB-R13 n=n+4) every 40 ms (and a new HYPER-SFN-LSB-R13) the disadvantage caused by Midhaul transmission issues such as illustrated in FIGS. 3 and 4 can be overcome. In particular, in the NBIOT system, low latency can be achieved.

FIG. 7 illustrates a flow diagram of a method for implementing of dynamic content handling of inter-layer messages according to an embodiment.

Referring to FIG. 7, in step 701, the vCU receives at least one Master Information Block (MIB) parameter configured by a virtual element management system (vEMS) (e.g., the MIB parameters are predetermined by an operator and input via the EMS GUI).

In step 702, the vCU prepares a MIB encoded buffer as per the received configuration from EMS (i.e., vEMS) in step 701 with a dummy SFN (D-SFN) (i.e., vCU prepares a MIB encoded buffer comprising a D-SFN (e.g., a D-SFN n=64)).

In step 703, the vCU sends the MIB encoded buffer with dummy SFN (D-SFN) once at the time of startup initiation, the MIB to a virtual distributed unit (vDU) via a Midhaul between the vCU and the vDU (i.e., the vCU and vDU are instantiated (running) in separated pods in the cloud native environment and communicate via the Midhaul connection between the vCU and the vDU).

In step 704, the vDU receives the MIB encoded buffer with the D-SFN via the Midhaul from the vCU.

In step 705, the vDU calculates a new SFN from a utility function and updates the MIB encoded buffer with the new SFN (i.e., the vDU replaces the D-SFN with the new SFN from a utility function). In an example embodiment, the vDU calculates the new SFN from the utility function using epoch time as a base and/or may updates it at a fixed offset position (i.e., a fixed offset position that is pre-shared by vCU and the vDU) in the MIB message encoded buffer.

In step 706, the vDU sends the updated MIB encoded buffer with the new SFN from the utility function to at least one UE.

In step 707, for each received MIB encoded buffer from the vCU, the vDU updates the MIB encoded buffer, calculates a new SFN from the utility function and sends the updated MIB encoded buffer with the new SFN from the utility function to at least one user entity (UE).

In an example embodiment, every 40 ms, the vDU calculates the new SFN from the utility function using epoch time as a base and updates it at a fixed offset position (i.e., a fixed offset position that is pre-shared by vCU and the vDU) in MIB message encoded buffer and send it to UE.

Referring to FIG. 7, the systems and methods for implementing dynamic content handling of inter-layer messages in a pod based cloud native environment of a telecommunications network has the advantage that it requires minimal changes only at the vDU. As a result, the systems and methods are in line (compatible) with existing designs (i.e., existing O-RAN architectures of LTE and/or NBIOT systems), wherein the vCU reads (receives) all configurations from the EMS. Moreover, a RRC layer functionality split is not required (i.e., the RRC layer functionality remains at the vCU side) leading to a clear logical separation of the RRC protocol. In addition, the systems and methods cause no additional processing overhead on the vDU. In particular, this advantage has a beneficial technical effect because the vDU already handles many time-critical (time-sensitive) processes (e.g., time-critical messages of UE according to FIG. 3) requiring high CPU utilization.

Furthermore, the systems and methods, in accordance with FIG. 7, does not require an interface change of the Midhaul between the vCU and vDU. To this end, the systems and methods use the fixed offset position (i.e., an offset position shared by vCU and the vDU) as set forth above.

Figure 8:
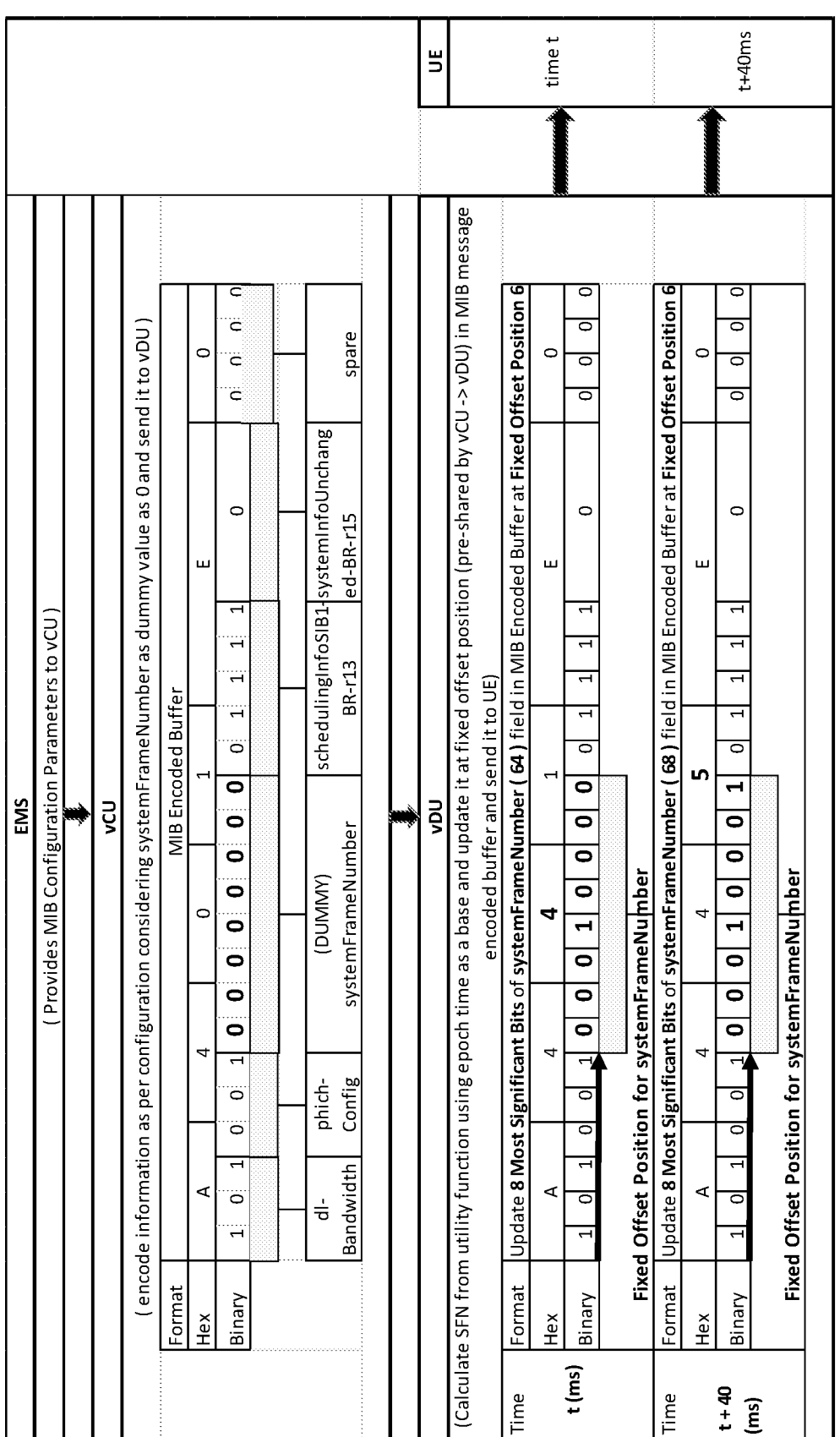
FIG. 8 illustrates a sample calculation of the SFN by the vDU according to an embodiment.

FIG. 8 illustrates a sample calculation of the SFN by the vDU according to an embodiment. Referring to FIG. 8, in a LTE system, the vCU may encode a MIB message such as a broadcast control channel message comprising a SFN (e.g., a SFN={8, 0x00} with a Hex dump of the encoded record is HEX A4 01 E0.

To this end, the vDU may calculate the SFN from the utility function using epoch time as a base and update it at a fixed offset position (i.e., an offset position shared by vCU and the vDU) in the MIB message encoded buffer and send it to UE.

For example, at time t, when a SFN is 64 (Binary 10 Bit: 0001000000), the vDU may fill the 8 MSB of it in SFN field in the encoded buffer as 64 (Binary 8 Bit: 00010000). Thus, the MIB buffer towards UE is for SFN n=64 (HEX A4 41 E0).

Subsequently, at a time t+40 ms (i.e., the time of updating the SFN after the loop duration according to the SFN generation periodicity), the SFN is updated to 68 (n=n+4=68) (Binary 10 Bit: 0001000100). The vDU may fill the 8 MSB of it in SFN field in encoded buffer as 68 (Binary 8 Bit: 00010001). Thus, the MIB Buffer towards UE may be set to SFN n=68 (HEX A4 45 E0) after the update.

According to embodiments, a system for implementing dynamic content handling of inter layer messages in a pod based cloud native environment of a telecommunications network, the system includes: at least one memory storing instructions; and at least one processor configured to execute the instructions to: receive, by a virtual centralized unit (vCU), at least one Master Information Block (MIB) parameter configured by a virtual element management system (vEMS); prepare, by the vCU, a MIB encoded buffer may include a Dummy System Frame Number (D-SFN); send, by the vCU, once at the time of startup initiation, the MIB encoded buffer with the D-SFN to a virtual distributed unit (vDU) via a Midhaul between the vCU and the vDU; receive, by the vDU, the MIB encoded buffer with the D-SFN via the Midhaul from the vCU; for each received MIB encoded buffer from the vCU, by the vDU, calculate a new SFN from an utility function; update the MIB encoded buffer; and send the updated MIB encoded buffer with the new SFN from the utility function to at least one user entity (UE).

The at least one processor may be further configured to execute the instructions to: update, by the vDU, the D-SFN with the new SFN at fixed offset position that is pre-shared by the vCU and the vDU.

The D-SFN and the new SFN are an 8 bit SFN of a LTE system.

The D-SFN and the new SFN may include of a SFN-MSB-r13 and a hyperSFN-LSB-r13 of a NBIOT system.

The vCU is hosted in a pod based cloud native environment for implementing dynamic content handling of inter layer messages in the pod based cloud native environment of a telecommunications network, the pod based cloud native environment hosting the vCU may include: at least one memory storing instructions; and at least one processor configured to execute the instructions to: receive, by the vCU, at least one Master Information Block (MIB) parameter configured by a virtual element management system (vEMS); prepare, by the vCU, a MIB encoded buffer may include a Dummy System Frame Number (D-SFN); send, by the vCU, once at the time of startup initiation, the MIB encoded buffer with the D-SFN to a virtual distributed unit (vDU) via a Midhaul between the vCU and the vDU.

The vDU is hosted in a pod based cloud native environment for implementing dynamic content handling of inter layer messages in the pod based cloud native environment of a telecommunications network, the pod based cloud native environment hosting the vDU may include: at least one memory storing instructions; and at least one processor configured to execute the instructions to: receive, by the vDU, the MIB encoded buffer with the D-SFN via a Midhaul from a virtual centralized unit (vCU); for each received MIB encoded buffer from the vCU, by the vDU, calculate a new SFN from an utility function; update the MIB encoded buffer; and send the updated MIB encoded buffer with the new SFN from the utility function to at least one user entity (UE).

According to embodiments, a method for implementing dynamic content handling of inter layer messages in a pod based cloud native environment of a telecommunications network, the method includes: receiving, by a virtual centralized unit (vCU), at least one Master Information Block (MIB) parameter configured by a virtual element management system (vEMS); preparing, by the vCU, a MIB encoded buffer may include a Dummy System Frame Number (D-SFN); sending, by the vCU, once at the time of startup initiation, the MIB encoded buffer with the D-SFN to a virtual distributed unit (vDU) via a Midhaul between the vCU and the vDU; receiving, by the vDU, the MIB encoded buffer with the D-SFN via the Midhaul from the vCU; for each received MIB encoded buffer from the vCU, by the vDU, updating the MIB encoded buffer; calculating a new SFN from an utility function; updating the MIB encoded buffer; and sending the updated MIB encoded buffer with the new SFN from the utility function to at least one user entity (UE).

The method may include updating, by the vDU, the D-SFN with the new SFN at fixed offset position that is pre-shared by the vCU and the vDU.

The D-SFN and the new SFN are an 8 bit SFN of a LTE system.

The D-SFN and the new SFN may include of a SFN-MSB-r13 and a hyperSFN-LSB-r13 of a NBIOT system.

The vCU is hosted in a pod based cloud native environment for implementing dynamic content handling of inter layer messages in the pod based cloud native environment of a telecommunications network, the method may include: receiving, by the vCU, at least one Master Information Block (MIB) parameter configured by a virtual element management system (vEMS); preparing, by the vCU, a MIB encoded buffer may include a Dummy System Frame Number (D-SFN); sending, by the vCU, once at the time of startup initiation, the MIB encoded buffer with the D-SFN to a virtual distributed unit (vDU) via a Midhaul between the vCU and the vDU.

The vDU is hosted in a pod based cloud native environment for implementing dynamic content handling of inter layer messages in the pod based cloud native environment of a telecommunications network, the method may include: receiving, by the vDU, the MIB encoded buffer with the D-SFN via a Midhaul from a virtual centralized unit (vCU); for each received MIB encoded buffer from the vCU, by the vDU, calculating a new SFN from an utility function; updating the MIB encoded buffer; and sending the updated MIB encoded buffer with the new SFN from the utility function to at least one user entity (UE).

According to embodiments, a non-transitory computer-readable recording medium having recorded thereon instructions executable by at least one processor configured to perform a method for implementing dynamic content handling of inter layer messages in a pod based cloud native environment of a telecommunications network, the method includes: receiving, by a virtual centralized unit (vCU), at least one Master Information Block (MIB) parameter configured by a virtual element management system (vEMS); preparing, by the vCU, a MIB encoded buffer may include a dummy System Frame Number (D-SFN); sending, by the vCU, once at the time of startup initiation, the MIB encoded buffer with the D-SFN to a virtual distributed unit (vDU) via a Midhaul between the vCU and the vDU; receiving, by the vDU, the MIB encoded buffer with the D-SFN via the Midhaul from the vCU; for each received MIB encoded buffer from the vCU, by the vDU, calculate a new SFN from an utility function; update the MIB encoded buffer; and sending the updated MIB encoded buffer with the new SFN from the utility function to at least one user entity (UE).

The non-transitory computer-readable recording medium having recorded thereon instructions executable by at least one processor configured to perform a method that may include updating, by the vDU, the D-SFN with the new SFN at fixed offset position that is pre-shared by the vCU and the vDU.

The D-SFN and the new SFN are an 8 bit SFN of a LTE system.

The D-SFN and the new SFN may include of a SFN-MSB-r13 and a hyperSFN-LSB-r13 of a NBIOT system.

The instructions executable by at least one processor may be configured to implement the vCU to perform a method for implementing dynamic content handling of inter layer messages in a pod based cloud native environment of a telecommunications network, the method may include: receiving, by the vCU, at least one Master Information Block (MIB) parameter configured by a virtual element management system (vEMS); preparing, by the vCU, a MIB encoded buffer may include a Dummy System Frame Number (D-SFN); sending, by the vCU, once at the time of startup initiation, the MIB encoded buffer with the D-SFN to a virtual distributed unit (vDU) via a Midhaul between the vCU and the vDU.

The instructions executable by at least one processor may be configured to implement the vDU to perform a method for implementing dynamic content handling of inter layer messages in a pod based cloud native environment of a telecommunications network, the method may include: receiving, by the vDU, the MIB encoded buffer with the D-SFN via a Midhaul from a virtual centralized unit (vCU); for each received MIB encoded buffer from the vCU, by the vDU, calculating a new SFN from an utility function; updating the MIB encoded buffer; and sending the updated MIB encoded buffer with the new SFN from the utility function to at least one user entity (UE).

Figure 1B:
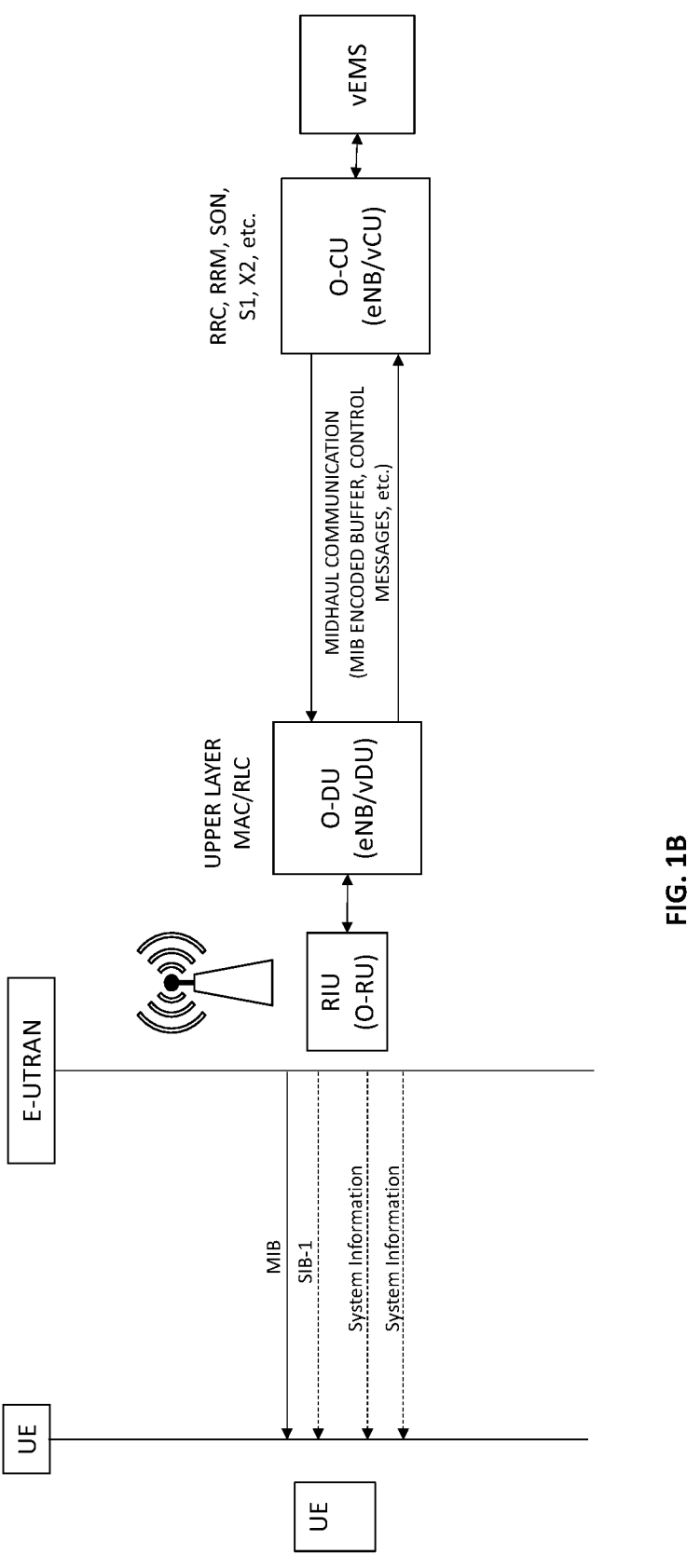
FIG. 1B illustrates a Radio Access Network (RAN) architecture implementing a split of E-UTRAN functionality in vCU and vDU according to the related art.
Figure 9:
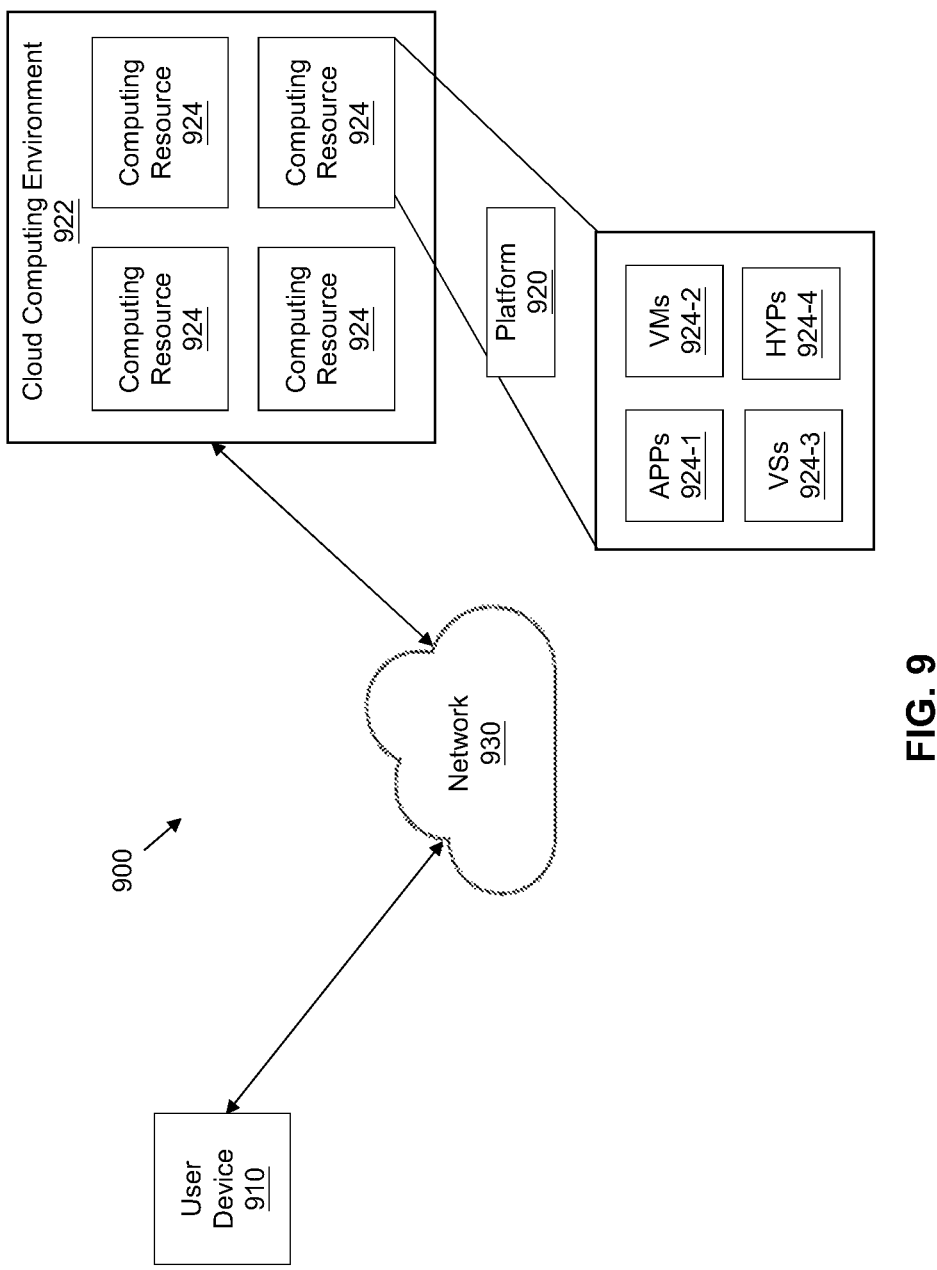
FIG. 9 is a diagram of an example environment in which systems and/or methods, described herein, may be implemented.

FIG. 9 is a diagram of an example environment 900 in which systems and/or methods, described herein, may be implemented. As shown in FIG. 9, environment 900 may include a user device 910, a platform 920, and a network 930. Devices of environment 900 may interconnect via wired connections, wireless connections, or a combination of wired and wireless connections. In embodiments, any of the functions and operations described with reference to FIG. 1A and 1B above may be performed by any combination of elements illustrated in FIG. 9.

User device 910 includes one or more devices capable of receiving, generating, storing, processing, and/or providing information associated with platform 920. For example, user device 910 may include a computing device (e.g., a desktop computer, a laptop computer, a tablet computer, a handheld computer, a smart speaker, a server, etc.), a mobile phone (e.g., a smart phone, a radiotelephone, etc.), a wearable device (e.g., a pair of smart glasses or a smart watch), or a similar device. In some implementations, user device 910 may receive information from and/or transmit information to platform 920.

Platform 920 includes one or more devices capable of receiving, generating, storing, processing, and/or providing information. In some implementations, platform 920 may include a cloud server or a group of cloud servers. In some implementations, platform 920 may be designed to be modular such that certain software components may be swapped in or out depending on a particular need. As such, platform 920 may be easily and/or quickly reconfigured for different uses.

In some implementations, as shown, platform 920 may be hosted in cloud computing environment 922. Notably, while implementations described herein describe platform 920 as being hosted in a cloud computing environment 922, in some implementations, platform 920 may not be cloud-based (i.e., may be implemented outside of a cloud computing environment) or may be partially cloud-based.

Cloud computing environment 922 includes an environment that hosts platform 920. Cloud computing environment 922 may provide computation, software, data access, storage, etc., services that do not require end-user (e.g., user device 910) knowledge of a physical location and configuration of system(s) and/or device(s) that hosts platform 920. As shown, cloud computing environment 922 may include a group of computing resources 924 (referred to collectively as "computing resources 924" and individually as "computing resource 924").

Computing resource 924 includes one or more personal computers, a cluster of computing devices, workstation computers, server devices, or other types of computation and/or communication devices. In some implementations, computing resource 924 may host platform 920. The cloud resources may include compute instances executing in computing resource 924, storage devices provided in computing resource 924, data transfer devices provided by computing resource 924, etc. In some implementations, computing resource 924 may communicate with other computing resources 924 via wired connections, wireless connections, or a combination of wired and wireless connections.

As further shown in FIG. 9, computing resource 924 includes a group of cloud resources, such as one or more applications ("APPs") 924-1, one or more virtual machines ("VMs") 924-2, virtualized storage ("VSs") 924-3, one or more hypervisors ("HYPs") 924-4, or the like.

Application 924-1 includes one or more software applications that may be provided to or accessed by user device 910. Application 924-1 may eliminate a need to install and execute the software applications on user device 910. For example, application 924-1 may include software associated with platform 920 and/or any other software capable of being provided via cloud computing environment 922. In some implementations, one application 924-1 may send/receive information to/from one or more other applications 924-1, via virtual machine 924-2.

Virtual machine 924-2 includes a software implementation of a machine (e.g., a computer) that executes programs like a physical machine. Virtual machine 924-2 may be either a system virtual machine or a process virtual machine, depending upon use and degree of correspondence to any real machine by virtual machine 924-2. A system virtual machine may provide a complete system platform that supports execution of a complete operating system ("OS"). A process virtual machine may execute a single program, and may support a single process. In some implementations, virtual machine 924-2 may execute on behalf of a user (e.g., user device 910), and may manage infrastructure of cloud computing environment 922, such as data management, synchronization, or long-duration data transfers.

Virtualized storage 924-3 includes one or more storage systems and/or one or more devices that use virtualization techniques within the storage systems or devices of computing resource 924. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 924-4 may provide hardware virtualization techniques that allow multiple operating systems (e.g., "guest operating systems") to execute concurrently on a host computer, such as computing resource 924. Hypervisor 924-4 may present a virtual operating platform to the guest operating systems, and may manage the execution of the guest operating systems. Multiple instances of a variety of operating systems may share virtualized hardware resources.

Network 930 includes one or more wired and/or wireless networks. For example, network 930 may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, or the like, and/or a combination of these or other types of networks.

The number and arrangement of devices and networks shown in FIG. 9 are provided as an example. In practice, there may be additional devices and/or networks, fewer devices and/or networks, different devices and/or networks, or differently arranged devices and/or networks than those shown in FIG. 9. Furthermore, two or more devices shown in FIG. 9 may be implemented within a single device, or a single device shown in FIG. 9 may be implemented as multiple, distributed devices. Additionally, or alternatively, a set of devices (e.g., one or more devices) of environment 900 may perform one or more functions described as being performed by another set of devices of environment 900.

Figure 10:
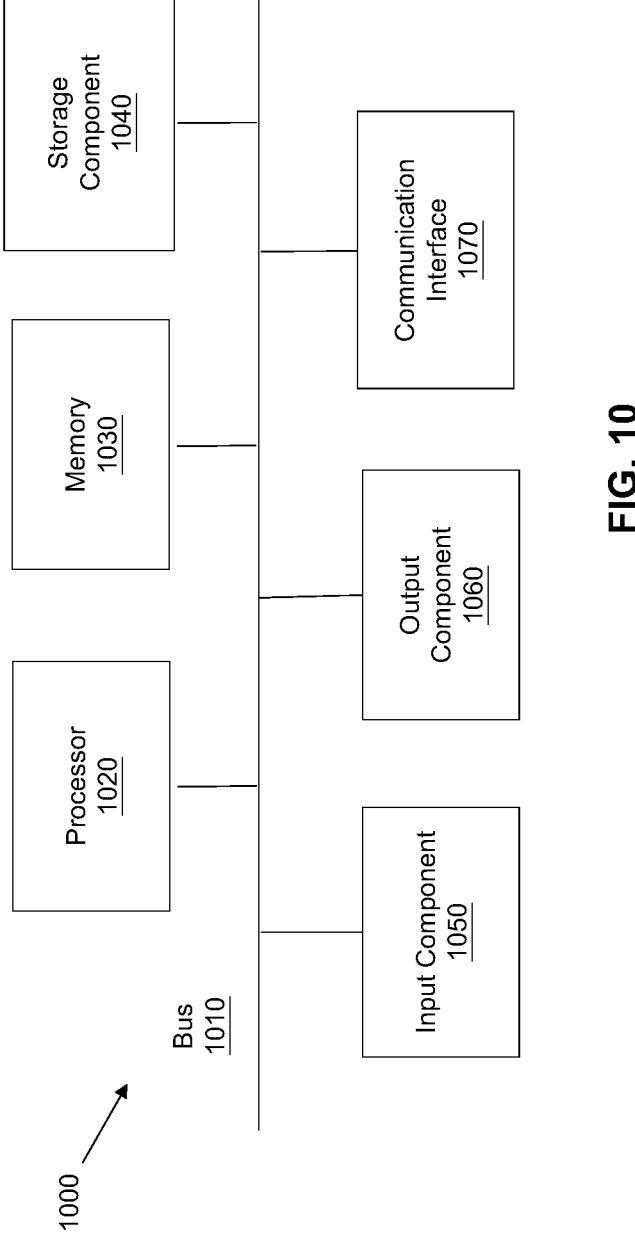
FIG. 10 is a diagram of example components of a device according to an embodiment.

FIG. 10 is a diagram of example components of a device 1000. Device 1000 may correspond to user device 910 and/or platform 920. As shown in FIG. 10, device 1000 may include a bus 1010, a processor 1020, a memory 1030, a storage component 1040, an input component 1050, an output component 1060, and a communication interface 1070.

Bus 1010 includes a component that permits communication among the components of device 1000. Processor 1020 may be implemented in hardware, firmware, or a combination of hardware and software. Processor 1020 may be a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 1020 includes one or more processors capable of being programmed to perform a function. Memory 1030 includes a random access memory (RAM), a read only memory (ROM), and/or another type of dynamic or static storage device (e.g., a flash memory, a magnetic memory, and/or an optical memory) that stores information and/or instructions for use by processor 1020.

Storage component 1040 stores information and/or software related to the operation and use of device 1000. For example, storage component 1040 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive. Input component 1050 includes a component that permits device 1000 to receive information, such as via user input (e.g., a touch screen display, a keyboard, a keypad, a mouse, a button, a switch, and/or a microphone). Additionally, or alternatively, input component 1050 may include a sensor for sensing information (e.g., a global positioning system (GPS) component, an accelerometer, a gyroscope, and/or an actuator). Output component 1060 includes a component that provides output information from device 1000 (e.g., a display, a speaker, and/or one or more light-emitting diodes (LEDs)).

Communication interface 1070 includes a transceiver-like component (e.g., a transceiver and/or a separate receiver and transmitter) that enables device 1000 to communicate with other devices, such as via a wired connection, a wireless connection, or a combination of wired and wireless connections. Communication interface 1070 may permit device 1000 to receive information from another device and/or provide information to another device. For example, communication interface 1070 may include an Ethernet interface, an optical interface, a coaxial interface, an infrared interface, a radio frequency (RF) interface, a universal serial bus (USB) interface, a Wi-Fi interface, a cellular network interface, or the like.

Device 1000 may perform one or more processes described herein. Device 1000 may perform these processes in response to processor 1020 executing software instructions stored by a non-transitory computer-readable medium, such as memory 1030 and/or storage component 1040. A computer-readable medium is defined herein as a non-transitory memory device. A memory device includes memory space within a single physical storage device or memory space spread across multiple physical storage devices.

Software instructions may be read into memory 1030 and/or storage component 1040 from another computer-readable medium or from another device via communication interface 1070. When executed, software instructions stored in memory 1030 and/or storage component 1040 may cause processor 1020 to perform one or more processes described herein.

Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 10 are provided as an example. In practice, device 1000 may include additional components, fewer components, different components, or differently arranged components than those shown in FIG. 10. Additionally, or alternatively, a set of components (e.g., one or more components) of device 1000 may perform one or more functions described as being performed by another set of components of device 1000.

In embodiments, any one of the operations or processes of FIGS. 1 to 8 may be implemented by or using any one of the elements illustrated in FIGS. 9 and 10. It is understood that other embodiments are not limited thereto, and may be implemented in a variety of different architectures (e.g., bare metal architecture, any cloud-based architecture or deployment architecture such as Kubernetes, Docker, OpenStack, etc.).

The foregoing disclosure provides illustration and description, but is not intended to be exhaustive or to limit the implementations to the precise form disclosed. Modifications and variations are possible in light of the above disclosure or may be acquired from practice of the implementations.

Some embodiments may relate to a system, a method, and/or a computer readable medium at any possible technical detail level of integration. Further, one or more of the above components described above may be implemented as instructions stored on a computer readable medium and executable by at least one processor (and/or may include at least one processor). The computer readable medium may include a computer-readable non-transitory storage medium (or media) having computer readable program instructions thereon for causing a processor to carry out operations.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program code/instructions for carrying out operations may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects or operations.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer readable media according to various embodiments. In this regard, each block in the flowchart or block diagrams may represent a microservice(s), module, segment, or portion of instructions, which comprises one or more executable instructions for implementing the specified logical function(s). The method, computer system, and computer readable medium may include additional blocks, fewer blocks, different blocks, or differently arranged blocks than those depicted in the Figures. In some alternative implementations, the functions noted in the blocks may occur out of the order noted in the Figures. For example, two blocks shown in succession may, in fact, be executed concurrently or substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

What is claimed is:

1. A system for implementing dynamic content handling of inter layer messages in a pod based cloud native environment of a telecommunications network, the system comprising:
    at least one memory storing instructions; and
    at least one processor configured to execute the instructions to:
        receive, by a virtual centralized unit (vCU), at least one Master Information Block (MIB) parameter configured by a virtual element management system (vEMS);
        prepare, by the vCU, a MIB encoded buffer comprising a Dummy System Frame Number (D-SFN);
        send, by the vCU, once at the time of startup initiation, the MIB encoded buffer with the D-SFN to a virtual distributed unit (vDU) via a Midhaul between the vCU and the vDU;
        receive, by the vDU, the MIB encoded buffer with the D-SFN via the Midhaul from the vCU;
        for the received MIB encoded buffer from the vCU, by the vDU,
            calculate a new SFN from a utility function;
            update the MIB encoded buffer; and
            send the updated MIB encoded buffer with the new SFN from the utility function to at least one user entity (UE).

2. The system as claimed in claim 1, wherein the at least one processor is further configured to execute the instructions to:
    update, by the vDU, the D-SFN with the new SFN at fixed offset position that is pre-shared by the vCU and the vDU.

3. The system as claimed in claim 1, wherein the D-SFN and the new SFN are an 8 bit SFN of a Long-Term Evolution (LTE) system.

4. The system as claimed in claim 1, wherein the D-SFN and the new SFN comprise of a System Frame Number-Most Significant Bit (SFN-MSB) parameter and a hyper System Frame Number-Least Significant Bit (hyperSFN-LSB) parameter of a Narrowband Internet of Things (NBIOT) system.

5. The system as claimed in claim 1, wherein the vCU is hosted in a pod based cloud native environment for implementing dynamic content handling of inter layer messages in the pod based cloud native environment of the telecommunications network.

6. The system as claimed in claim 1, wherein the vDU is hosted in a pod based cloud native environment for implementing dynamic content handling of inter layer messages in the pod based cloud native environment of the telecommunications network.

7. A method for implementing dynamic content handling of inter layer messages in a pod based cloud native environment of a telecommunications network, the method comprising:
    receiving, by a virtual centralized unit (vCU), at least one Master Information Block (MIB) parameter configured by a virtual element management system (vEMS);
    preparing, by the vCU, a MIB encoded buffer comprising a Dummy System Frame Number (D-SFN);
    sending, by the vCU, once at the time of startup initiation, the MIB encoded buffer with the D-SFN to a virtual distributed unit (vDU) via a Midhaul between the vCU and the vDU;
    receiving, by the vDU, the MIB encoded buffer with the D-SFN via the Midhaul from the vCU;
    for the received MIB encoded buffer from the vCU, by the vDU,
        calculating a new SFN from a utility function;
        updating the MIB encoded buffer; and
        sending the updated MIB encoded buffer with the new SFN from the utility function to at least one user entity (UE).

8. The method as claimed in claim 7, wherein the method comprises:
    updating, by the vDU, the D-SFN with the new SFN at fixed offset position that is pre-shared by the vCU and the vDU.

9. The method as claimed in claim 7, wherein the D-SFN and the new SFN are an 8 bit SFN of a Long-Term Evolution (LTE) system.

10. The method as claimed in claim 7, wherein the D-SFN and the new SFN comprise of a System Frame Number-Most Significant Bit (SFN-MSB) parameter and a hyper System Frame Number-Least Significant Bit (hyperSFN-LSB) parameter of a Narrowband Internet of Things (NBIOT) system.

11. The method as claimed in claim 7, wherein the vCU is hosted in a pod based cloud native environment for implementing dynamic content handling of inter layer messages in the pod based cloud native environment of the telecommunications network.

12. The method as claimed in claim 7, wherein the vDU is hosted in a pod based cloud native environment for implementing dynamic content handling of inter layer messages in the pod based cloud native environment of the telecommunications network.

13. A non-transitory computer-readable recording medium having recorded thereon instructions executable by at least one processor configured to perform a method for implementing dynamic content handling of inter layer messages in a pod based cloud native environment of a telecommunications network, the method comprising:

receiving, by a virtual centralized unit (vCU), at least one Master Information Block (MIB) parameter configured by a virtual element management system (vEMS);

preparing, by the vCU, a MIB encoded buffer comprising a dummy System Frame Number (D-SFN);

sending, by the vCU, once at the time of startup initiation, the MIB encoded buffer with the D-SFN to a virtual distributed unit (vDU) via a Midhaul between the vCU and the vDU;

receiving, by the vDU, the MIB encoded buffer with the D-SFN via the Midhaul from the vCU;

for the received MIB encoded buffer from the vCU, by the vDU, calculating a new SFN from a utility function;

updating the MIB encoded buffer; and sending the updated MIB encoded buffer with the new SFN from the utility function to at least one user entity (UE).

14. The non-transitory computer-readable recording medium as claimed in claim 13, wherein the method comprises:

updating, by the vDU, the D-SFN with the new SFN at fixed offset position that is pre-shared by the vCU and the vDU.

15. The non-transitory computer-readable recording medium as claimed in claim 13, wherein the D-SFN and the new SFN are an 8 bit SFN of a Long-Term Evolution (LTE) system.

16. The non-transitory computer-readable recording medium as claimed in claim 13, wherein the D-SFN and the new SFN comprise of a System Frame Number-Most Significant Bit (SFN-MSB) parameter and a hyper System Frame Number-Least Significant Bit (hyperSFN-LSB) parameter of a Narrowband Internet of Things (NBIOT) system.

17. The non-transitory computer-readable recording medium as claimed in claim 13, wherein the vCU is hosted in a pod based cloud native environment for implementing dynamic content handling of inter layer messages in the pod based cloud native environment of the telecommunications network.

18. The non-transitory computer-readable recording medium as claimed in claim 13, wherein the vDU is hosted in a pod based cloud native environment for implementing dynamic content handling of inter layer messages in the pod based cloud native environment of the telecommunications network.

\* \* \* \* \*